United States Patent [19]

Kashiyama

[11] Patent Number: 5,359,268
[45] Date of Patent: Oct. 25, 1994

[54] CONTROL APPARATUS FOR VIBRATION DRIVEN MOTOR

[75] Inventor: Ritsuo Kashiyama, Yokohama, Japan

[73] Assignee: Canon Kabushiki Kaisha, Tokyo, Japan

[21] Appl. No.: 975,513

[22] Filed: Nov. 12, 1992

[30] Foreign Application Priority Data

Nov. 12, 1991 [JP] Japan .................. 3-295762
Jan. 7, 1992 [JP] Japan .................. 4-001028

[51] Int. Cl.$^5$ .................. H01L 41/08
[52] U.S. Cl. .................. 318/116; 310/323; 310/316
[58] Field of Search .................. 310/316, 317; 318/116

[56] References Cited

U.S. PATENT DOCUMENTS

| | | | |
|---|---|---|---|
| 4,794,294 | 12/1988 | Shimizu et al. | 310/316 |
| 4,926,084 | 5/1990 | Furutsu et al. | 310/316 |
| 4,965,481 | 10/1990 | Kashiyama | 310/316 |
| 4,998,048 | 3/1991 | Furutsu | 318/116 |
| 5,013,982 | 5/1991 | Sasaki | 318/116 X |
| 5,136,215 | 8/1992 | Izukawa | 318/116 |
| 5,140,231 | 8/1992 | Kashiyama | 318/116 |
| 5,155,418 | 10/1992 | Katsoka | 318/116 |
| 5,159,253 | 10/1992 | Shimizu et al. | 310/316 X |
| 5,165,047 | 11/1992 | Shimizu | 318/116 |
| 5,198,732 | 3/1993 | Morimoto | 318/116 |

Primary Examiner—Mark O. Budd
Attorney, Agent, or Firm—Fitzpatrick, Cella, Harper & Scinto

[57] ABSTRACT

A control apparatus for a vibration driven motor, which obtains a driving force by forming a vibration wave upon application of a frequency signal to electromechanical converting elements. The control apparatus includes a pulse oscillation circuit, a counter for counting pulses from the pulse oscillation circuit, and a data set circuit for setting numerical value data. Every time the count value of the counter coincides with the data set in the set circuit, an output is generated, and the control circuit controls the frequency of the frequency signal according to the frequency of the generated output.

12 Claims, 20 Drawing Sheets

CONTROL APPARATUS FOR VIBRATION DRIVEN MOTOR

BACKGROUND OF THE INVENTION

1. Field of the Invention

The present invention relates to a driving circuit for a so-called vibration motor (vibration driven motor) for frictionally driving a moving member contacting a vibrating member by a vibration generated in the vibrating member.

2. Related Background Art

FIG. 5 shows a conventional vibration driven motor driving circuit. The circuit shown in FIG. 5 includes a microcomputer 51 for controlling a driving operation of a vibration driven motor, a D/A converter 52 for converting a digital signal output from the microcomputer 51 into an analog signal, a variable frequency oscillator (VCO) 53 whose oscillation frequency is controlled by an output voltage from the D/A converter, a D-flip-flop (D-F/F) 54 for frequency-dividing the output signal from the VCO 53 with 2, D-F/Fs 55 and 56 for generating signals, having different phases and the same frequency, for driving the vibration driven motor, an EXCLUSIVE-OR (EX-OR) gate 57 for changing the rotational direction of the vibration driven motor, AND gates 58 and 59 for controlling driving and stopping operations of the vibration driven motor, a high-voltage power source 60 for driving the vibration driven motor, power amplifiers 61 and 62 for driving the vibration driven motor, matching coils 63 and 64 for driving the vibration driven motor, and a main body 65 of the vibration driven motor.

An operation will be described below with reference to the above-mentioned circuit. The relationship between the driving frequency and the rotation speed of the vibration driven motor has characteristics, as shown in FIG. 4. In general, the driving frequency is scanned from f4 toward a lower frequency, and the frequency scan operation is stopped when the rotation speed reaches a predetermined value within a range between N1 and N2. In addition, the vibration driven motor has the following characteristics. That is, when the frequency is scanned to f0, the rotation speed becomes maximum. However, when the frequency is decreased from f0 even slightly, the rotation speed abruptly decreases.

In order to rotate such a vibration driven motor, the microcomputer 51 outputs data 00h to output ports PD0 to PD7. At this time, the output from the D/A converter becomes minimum, as shown in FIG. 6. The output from the D/A converter is input to the VCO 53, and the VCO 53 oscillates at a frequency four times the driving frequency f3, as shown in FIG. 7. The oscillation signal is input to a 90° phase shift circuit constituted by the D-F/Fs 54, 55, and 56, and the phase shift circuit generates vibration driven motor driving signals having the same frequency f4 and a 90° phase difference therebetween, as shown in FIG. 8.

Of these two signals, the 90° phase delayed output signal from the D-F/F 56 is input to the EX-OR gate 57. The EX-OR gate 57 also receives a rotational direction signal output from the DIR terminal of the microcomputer 51. When the DIR output is at Low level, the EX-OR gate 57 outputs a 90° phase delayed signal; when the DIR output is at High level, it outputs a 90° phase advanced signal, thereby switching the driving direction of the vibration driven motor.

The vibration driven motor driving signals generated in this manner are respectively input to the AND gates 58 and 59. When the ON terminal of the microcomputer 51 is at High level, the AND gates 58 and 59 output signals for driving the vibration driven motor. The output signals are input to the power amplifiers using the high-voltage power source 60 as a power source, and are amplified to electric power necessary for driving the vibration driven motor. The amplified signals are respectively applied to piezoelectric elements 65a and 65b of the vibration driven motor 65 through the matching coils 63 and 64. In this case, since the applied frequency is f4, the rotation speed of the vibration driven motor becomes 0, as shown in FIG. 4, and the motor is not rotated.

The microcomputer 51 changes outputs from the ports PD0 to PD7 from 00h to 01h, so that the output voltage from the D/A converter 52 is slightly increased, as shown in FIG. 6, and the oscillation frequency of the VCO 53 is slightly decreased. For this reason, since the frequency becomes f3 (FIG. 4), the vibration driven motor 65 begins to rotate at a rotation speed N3, as shown in FIG. 4. The microcomputer 51 changes the output data from the ports PD0 to PD7 so as to increase them in turn, thereby changing the oscillation frequency of the VCO in a decreasing direction to decrease.

Thus, the driving frequency applied to the vibration driven motor 65 is scanned to gradually decrease, and the rotation speed of the vibration driven motor 65 is increased, as shown in FIG. 4. When the rotation speed of the vibration driven motor 65 reaches a target rotation speed N1, the microcomputer 51 stops scanning data to be output from the ports PD0 to PD7, and outputs constant data. The driving frequency of the signals to be applied to the vibration driven motor at this time becomes f1.

Thereafter, the microcomputer 51 causes a rotation speed detection means (not shown) to detect the rotation speed of the vibration driven motor 65 so as to maintain the constant rotation speed of the vibration driven motor 65, and changes the output data from the ports PD0 to PD7, so that the rotation speed of the vibration driven motor 65 falls within a target speed range between N1 and N2, thereby changing the output voltage from the D/A converter 52 and the oscillation frequency of the VCO. Thus, the driving frequency of the signals to be applied to the vibration driven motor is controlled, so that the rotation speed of the vibration driven motor 65 falls within a target speed range.

However, the conventional circuit requires analog circuits such as a D/A converter, a VCO, and the like. For this reason, a high-precision D/A converter, and adjustment of the oscillation frequency of a VCO are required. In addition, since analog signals are weak against noise, the analog circuits are easily influenced by a change in atmospheric temperature. In order to construct these analog circuits in an IC, digital circuits and analog circuits must be constructed using complicated processes such as a Bi-CMOS process, a linear CMOS process, and the like, resulting in a complicated and expensive circuit.

SUMMARY OF THE INVENTION

One aspect of the application is to provide a vibration driven motor control apparatus, wherein oscillation pulses from an oscillation circuit are counted by a counter. A comparator is arranged so that every time the count value coincides with a data value set in a data set circuit, generating an output is arranged, and frequency control of a driving signal for a vibration driven motor is performed at an output generation period of the comparator.

One aspect of the application is to provide a vibration driven motor control apparatus, wherein a predetermined number of oscillation pulses from an oscillation circuit are counted by a first counter. Thereafter, the oscillation pulses are counted by a second counter. A comparator is arranged so that, when the count value of the second counter coincides with a data value set in a data set circuit, the comparator generates an output, and frequency control of a driving signal for a vibration driven motor is performed at an output generation period of the comparator.

One aspect of the application is to provide a vibration driven motor control apparatus, wherein a control circuit, which operates in a first mode for generating an output at a first period, and a second mode for generating an output at a second period, is arranged. The mode of the control circuit is switched at each predetermined timing, and the driving frequency output to a motor is controlled according to the period regulated by the mode.

Other objects of the present invention will become apparent from the embodiments to be described hereinafter with reference to the accompanying drawings.

DESCRIPTION OF THE PREFERRED EMBODIMENTS

Figure 1:
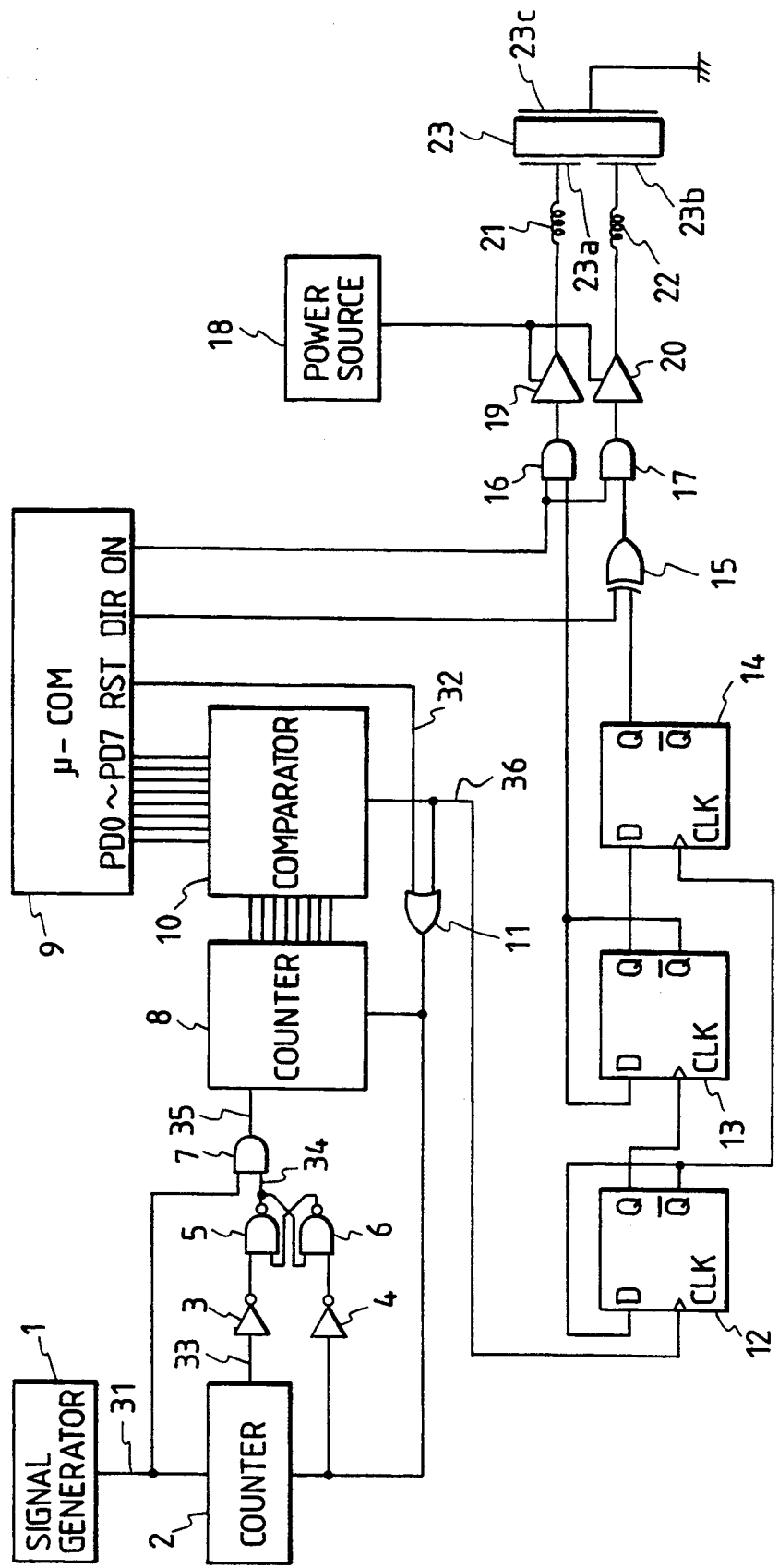
FIG. 1 is a circuit diagram of a vibration driven motor driving circuit according to an embodiment of the present invention.

FIG. 1 is a circuit diagram showing a vibration driven motor driving circuit according to an embodiment of the present invention. The circuit shown in FIG. 1 includes a signal generator 1 for generating a fixed high-frequency signal, a 9-bit counter 2 for receiving the high-frequency signal generated by the signal generator 1, inverters 3 and 4, 2-input NAND gates 5 and 6, which constitute an RS-flip-flop (RS-F/F) circuit, a 2-input NAND gate 7, an 8-bit counter 8 connected to the 2-input NAND gate 7, a microcomputer 9 for controlling the driving operation of a vibration driven motor, a magnitude comparator 10 for comparing data input from the microcomputer 9 and the 8-bit counter 8, an OR gate 11 for receiving the output from the magnitude comparator and the output from the RST terminal of the microcomputer 9, D-flip-flops (D-F/Fs) 12 to 14, an EXCLUSIVE-OR (EX-OR) gate 15, 2-input AND gates 16 and 17, a high-voltage power source 18 for driving the vibration driven motor, power amplifiers 19 and 20 for driving the vibration driven motor, matching coils 21 and 22 for driving the vibration driven motor, and a vibration driven motor 23.

An operation of the vibration driven motor driving circuit according to this embodiment with the above arrangement will be described below.

When the circuit receives a power supply voltage, the signal generator 1 starts oscillation. The oscillation frequency at this time is 72 MHz, and this signal is input to the 9-bit counter 2 and the AND gate 7 through a signal line 31 in FIG. 1. When the microcomputer 9 for controlling the vibration driven motor outputs a High-level signal as a reset signal from its RST terminal, the reset signal is supplied to the 9-bit counter 2, the RS-F/F circuit (NAND gates 5 and 6), and the 8-bit counter 8 through the OR gate 11 via a signal line 32. Thus, the count values of the 9-bit counter 2 and the 8-bit counter 8 are reset to "0", and the output from the NAND gate 5 constituting the RS-F/F circuit goes to Low level. The states of the respective signals at this time are indicated by a state A in FIG. 2.

When the reset signal RST from the microcomputer 9 goes to Low level, and the signal from the signal generator 1 goes from Low level to High level, the 9-bit counter 2 starts the counting operation, and keeps counting until the count value reaches 511. At this time, since an output 34 from the RS-F/F circuit is at Low level, the output from the AND gate 7 is at Low level, and no clock is input to the 8-bit counter 8. For this reason, the count value of the 8-bit counter is held to be "0". The states of the signals at this time are indicated by a state B in FIG. 2.

A case will be described below wherein a signal 31 from the signal generator 1 goes from Low level to High level when the count value of the 9-bit counter 2 is 511.

When the signal 31 goes from Low level to High level, the 9-bit counter 2 overflows, and outputs a carry signal onto a signal line 33. This signal is a positive logic signal. When the carry signal 33 is input to the NAND gate 5 constituting the RS-F/F circuit through the inverter 3, the output signal 34 from the RS-F/F circuit goes to High level. For this reason, since the output from the AND gate 7 becomes the AND result of the output signal 31 from the signal generator 1 and the output signal 34 from the NAND gate 5 constituting the RS-F/F circuit, the same signal as the output signal 31 from the signal generator 1 is output onto a signal line 35, and is input to the 8-bit counter 8. The states of the signals at this time are indicated by a state C in FIG. 2. The 8-bit counter 8 starts a counting operation since it receives a count clock signal. The 8-bit counter 8 outputs a count value as 8-bit parallel signals, and these signals are input to the magnitude comparator 10. The states of the signals at this time are indicated by a state D in FIG. 2.

Assuming that an output value from ports PD0 to PD7 of the microcomputer 9 for controlling the vibration driven motor is 23, when the count value of the 8-bit counter reaches 23, the two inputs (the output from the 8-bit counter 8 and the output from the microcomputer 9) of the magnitude comparator 10 become equal to each other, and a signal indicating that data coincide with each other is output onto a signal line 36. This signal is a positive logic signal, and goes from Low level to High level when data coincide with each other. The states of the signals at this time are indicated by a state E in FIG. 2.

When the signal on the signal line 36 goes from Low level to High level, the 9-bit counter 2, the 8-bit counter 8, and the RS-F/F circuit (NAND gates 5 and 6) are reset through the OR gate 11, and return to the same initial state as that when the microcomputer 9 outputs the reset signal. In addition, a High-level signal is input to a clock terminal CLK of the D-F/F 12. The states of the signals at this time are indicated by a state F in FIG. 2.

In this manner, the circuit described above repeats the states B to F in FIG. 2. Every time the count value of the 8-bit counter 8 coincides with data output from the ports PD0 to PD7 of the microcomputer 9, the output from the magnitude comparator 10 goes from Low level to High level, and a High-level clock is input to the clock input terminal of the D-F/F 12.

Figure 3:
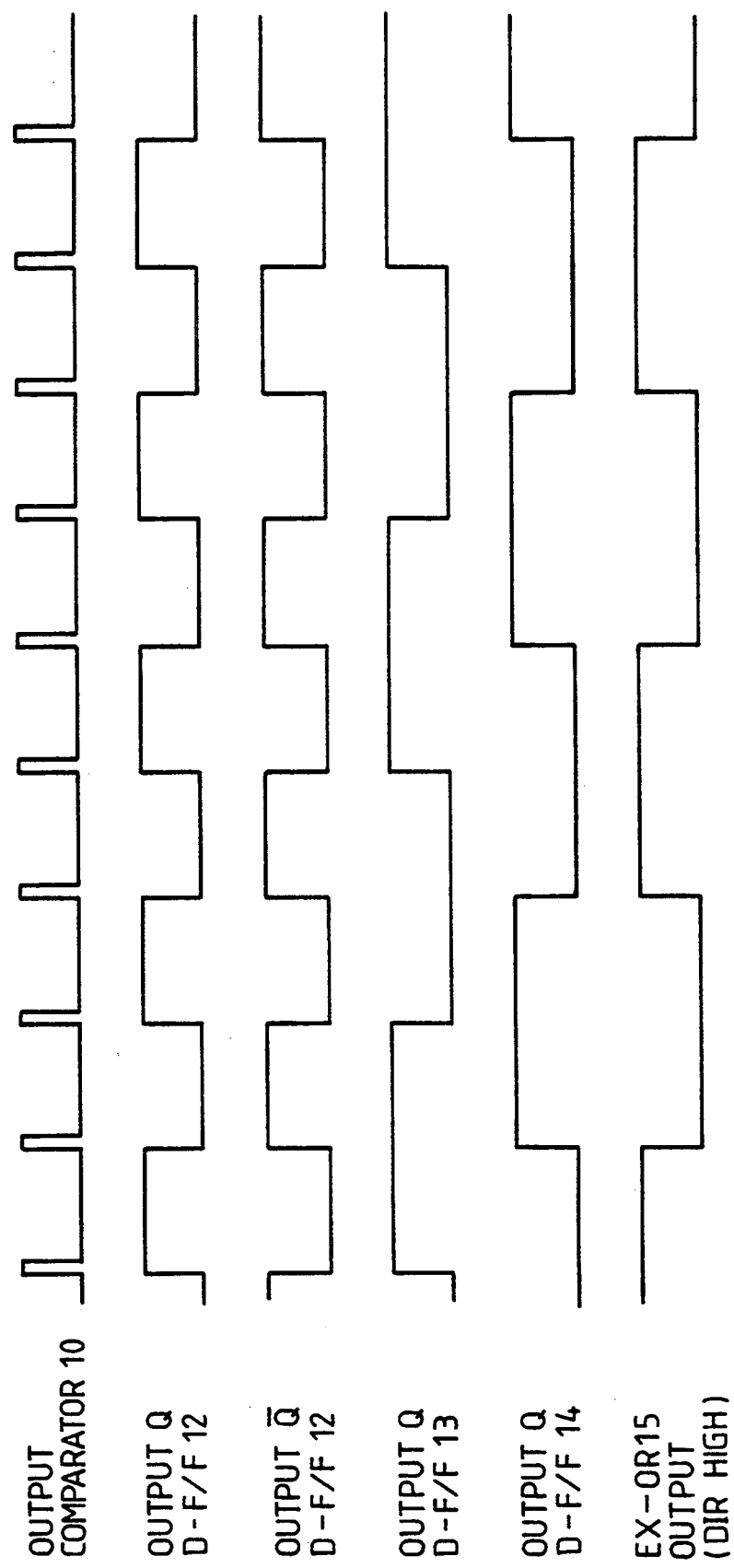
FIG. 3 is a timing chart showing timings from the output from the magnitude comparator until generation of a vibration driven motor driving signal of the vibration driven motor driving circuit according to one embodiment of the present invention.

The operation of the D-F/Fs 12, 13, and 14 will be described below with reference to the timing chart of FIG. 3.

Every time the D-F/F 12 receives the High-level signal at its clock signal terminal CLK, it inverts its Q (the Q output timing of the D-F/F 12 in FIG. 3) and $\overline{Q}$ outputs. For this reason, High-level clocks are alternately input to clock input terminals CLK of the D-F/Fs 13 and 14, and the D-F/Fs 13 and 14 invert their Q and $\overline{Q}$ outputs in response to the High-level clocks, as indicated by the Q output timings of the D-F/Fs 13 and 14 in FIG. 3. The Q outputs from the D-F/Fs 13 and 14 are signals having the same frequency, and a phase difference in which the phase of the Q output from the D-F/F 14 is delayed by 90° from that from the D-F/F 13. At this time, when the output from the DIR terminal of the microcomputer 9 is at Low level, the output from the EX-OR gate 15 becomes the same as the Q output from the D-F/F 14; when the output from the DIR terminal of the microcomputer 9 is at High level, the EX-OR gate 15 outputs a signal obtained by inverting the Q output from the D-F/F 14, and having the same frequency as that of the signal from the D-F/F 13, and a phase advanced by 90° from that of the signal from the D-F/F 13, as shown in FIG. 3. The two signals having the same frequency and ±90° phases are respectively input to the AND gates 16 and 17. When the ON terminal of the microcomputer 9 outputs a High-level signal, the AND gates 16 and 17 output the input signals; when the ON terminal outputs a Low-level signal, the outputs from the AND gates 16 and 17 go to Low level.

The two signals output from the AND gates 16 and 17, and having the same frequency and a phase difference therebetween are input to the power amplifiers using the high-voltage power source 18 (about 30 V) as a power source, and are amplified to electric power necessary for driving the vibration driven motor 23. The amplified signals having the same frequency and a phase difference therebetween are applied to driving piezoelectric elements 23a and 23b as electro-mechanical energy converting elements of the vibration driven motor 23 through the matching coils 21 and 22 for driving the vibration driven motor. When the applied signals have a frequency capable of driving the vibration driven motor 23, the vibration driven motor 23 is rotated.

Figure 4:
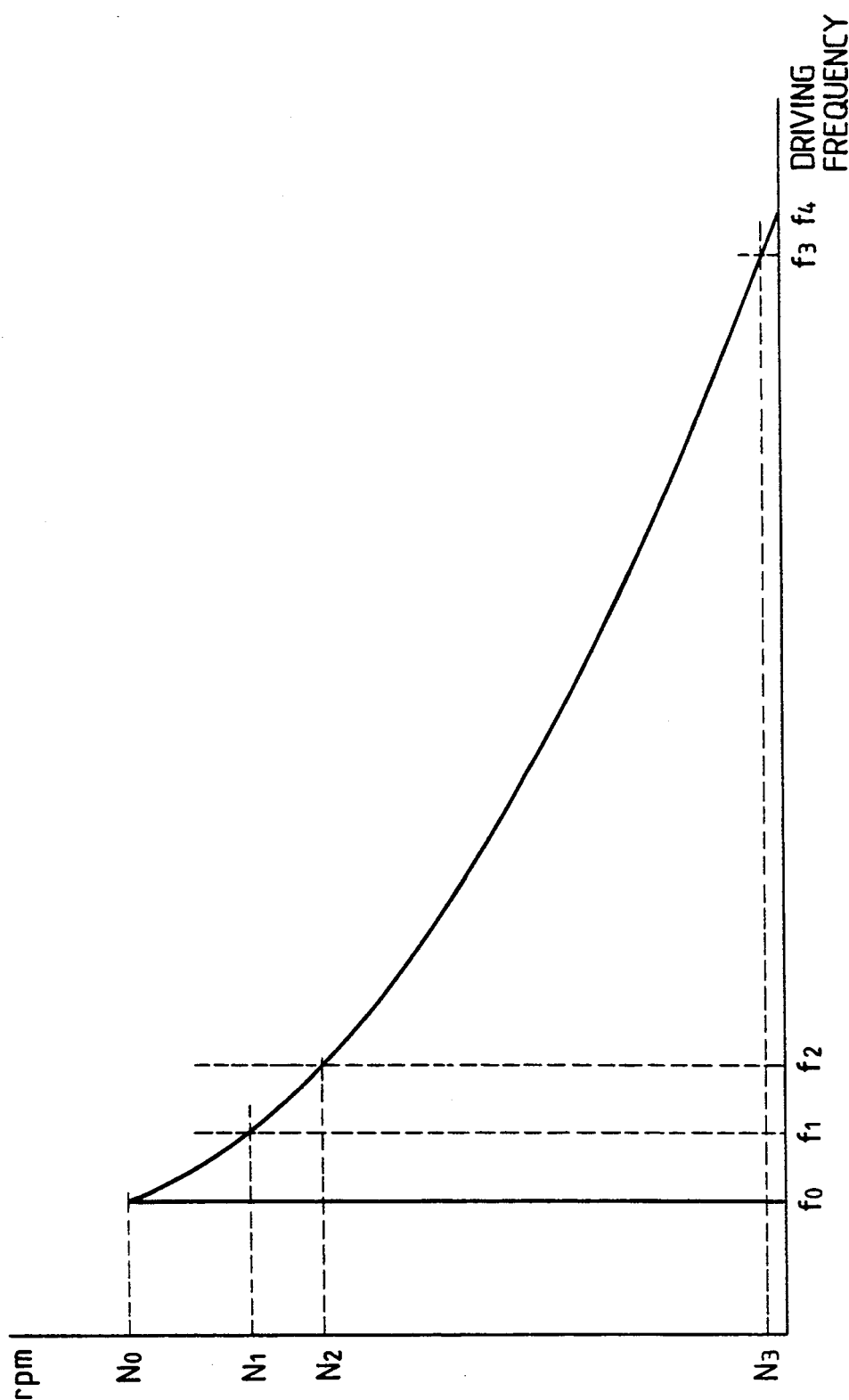
FIG. 4 is a graph showing the relationship between the frequency of a driving signal to be applied to a vibration driven motor, and the rotation speed of the vibration driven motor.
Figure 5:
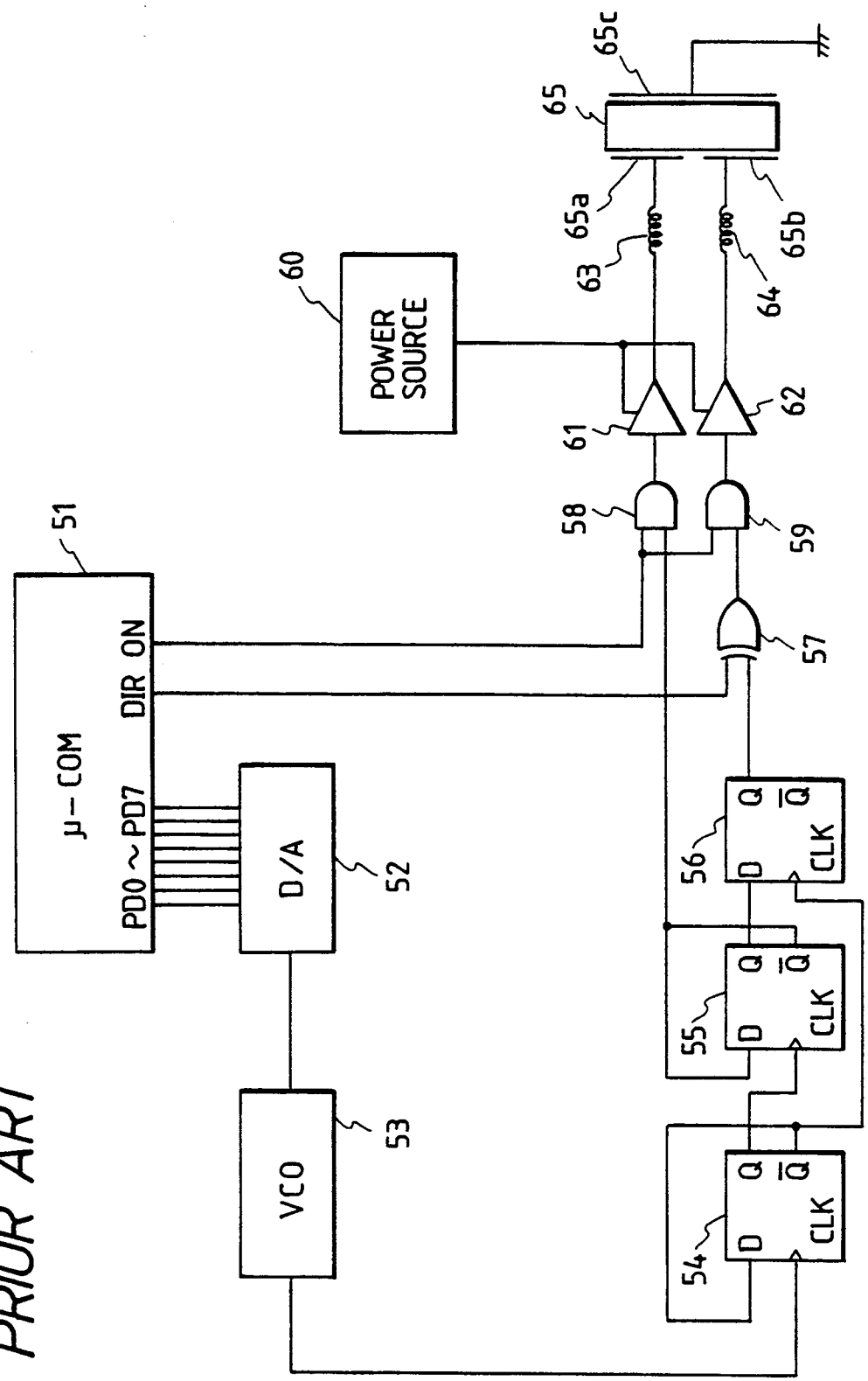
FIG. 5 is a circuit diagram of a conventional vibration driven motor driving circuit.
Figure 6:
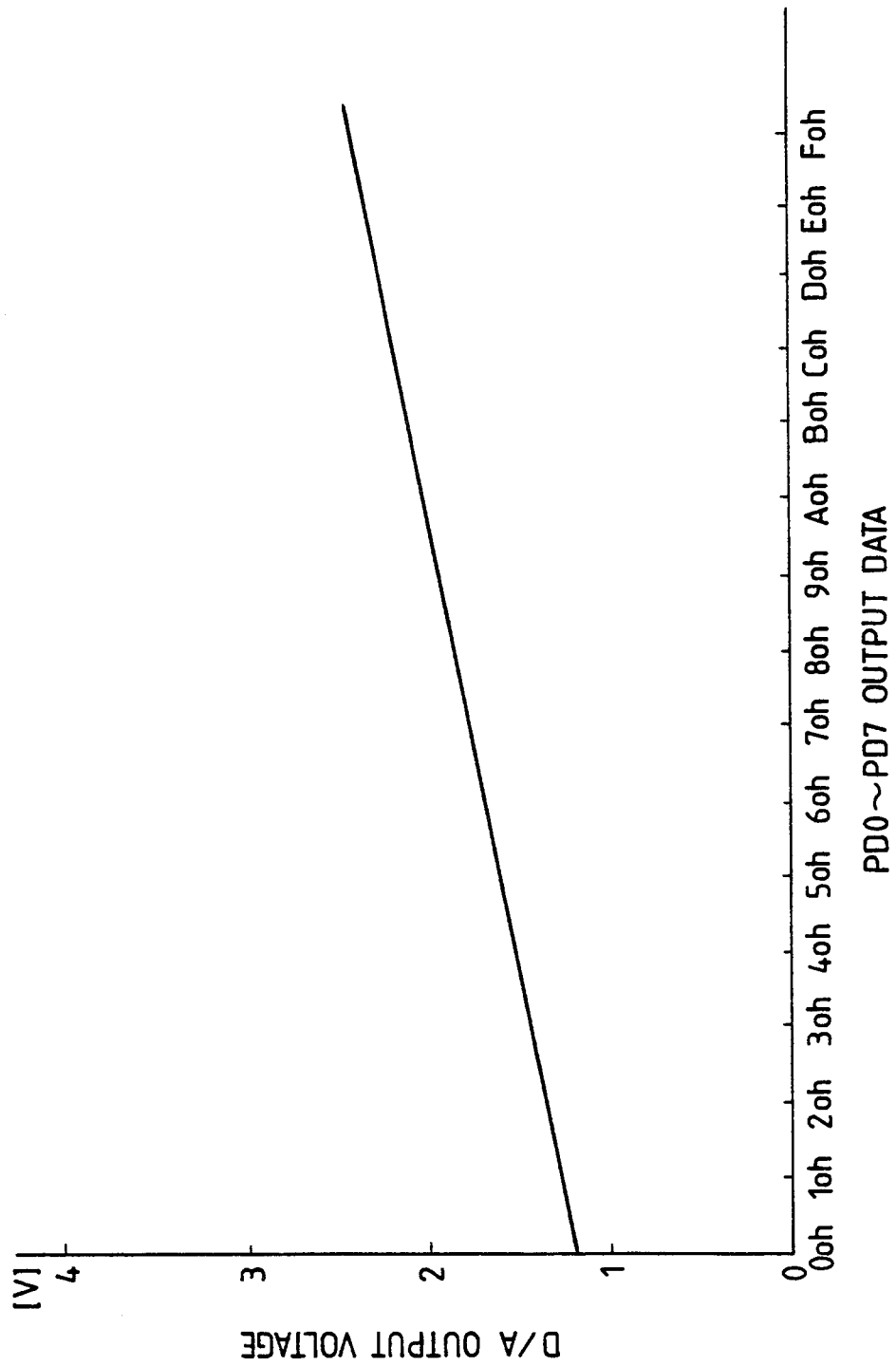
FIG. 6 is a graph showing the relationship between the input and output of a D/A converter of the conventional vibration driven motor driving circuit.
Figure 7:
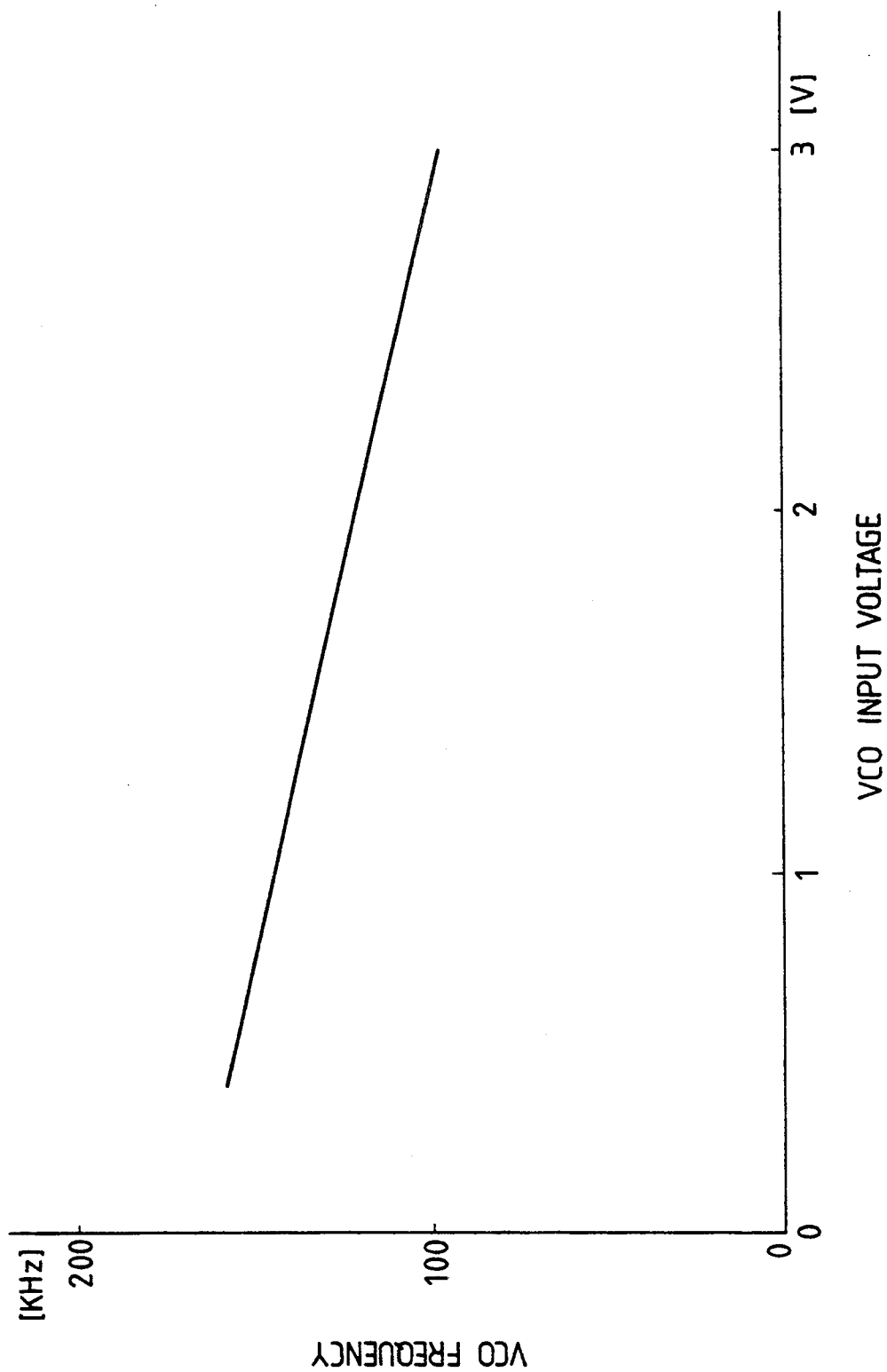
FIG. 7 is a graph showing the relationship between the input and output of a variable frequency oscillator (VCO) of the conventional vibration driven motor driving circuit.
Figure 8:
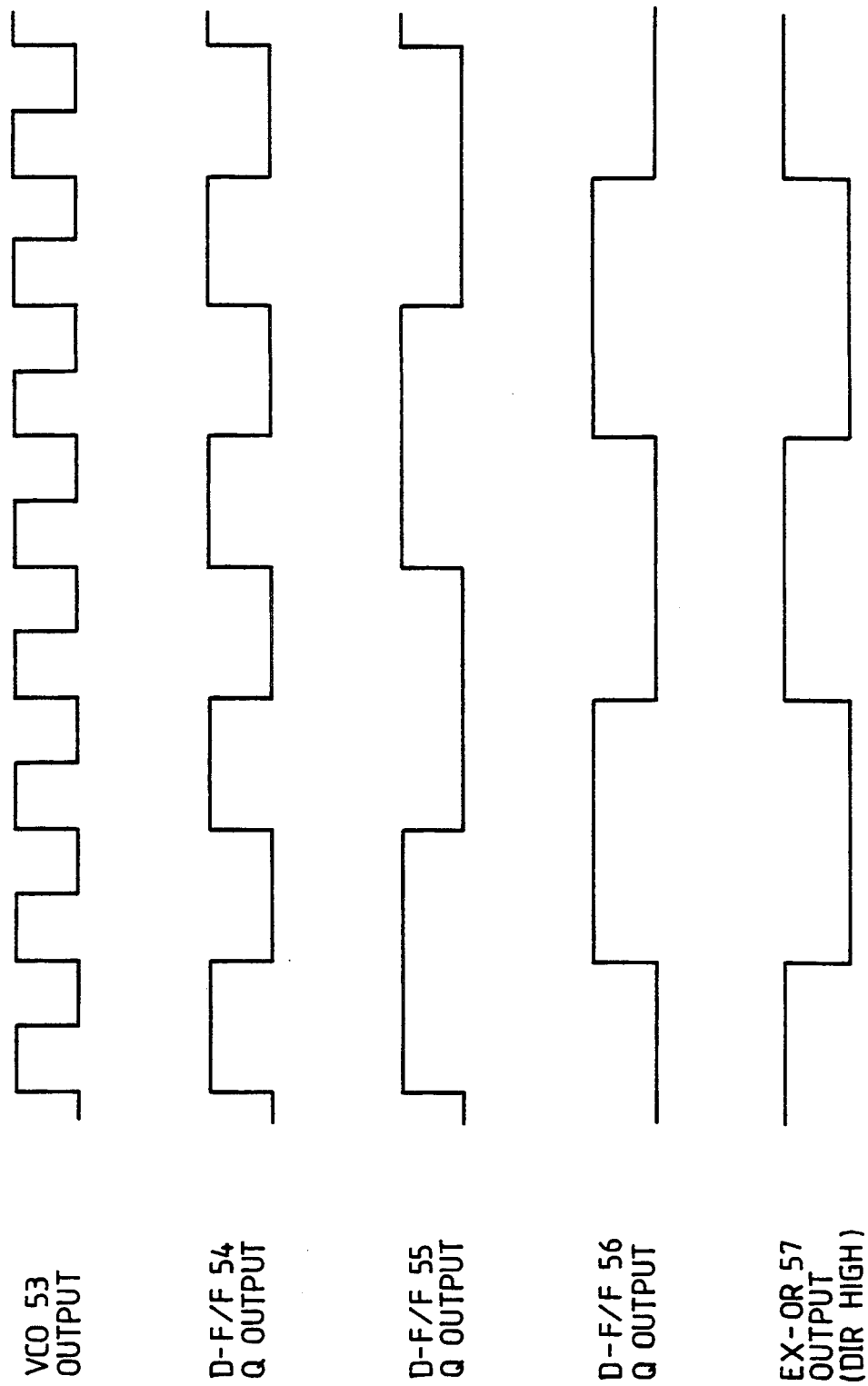
FIG. 8 is a timing chart showing timings of the conventional vibration driven motor driving circuit.

In order to control the driving operation of the vibration driven motor 23, the rotation speed must be changed by changing the driving frequency of the signals to be applied to the vibration driven motor, as shown in FIG. 4.

Figure 2:
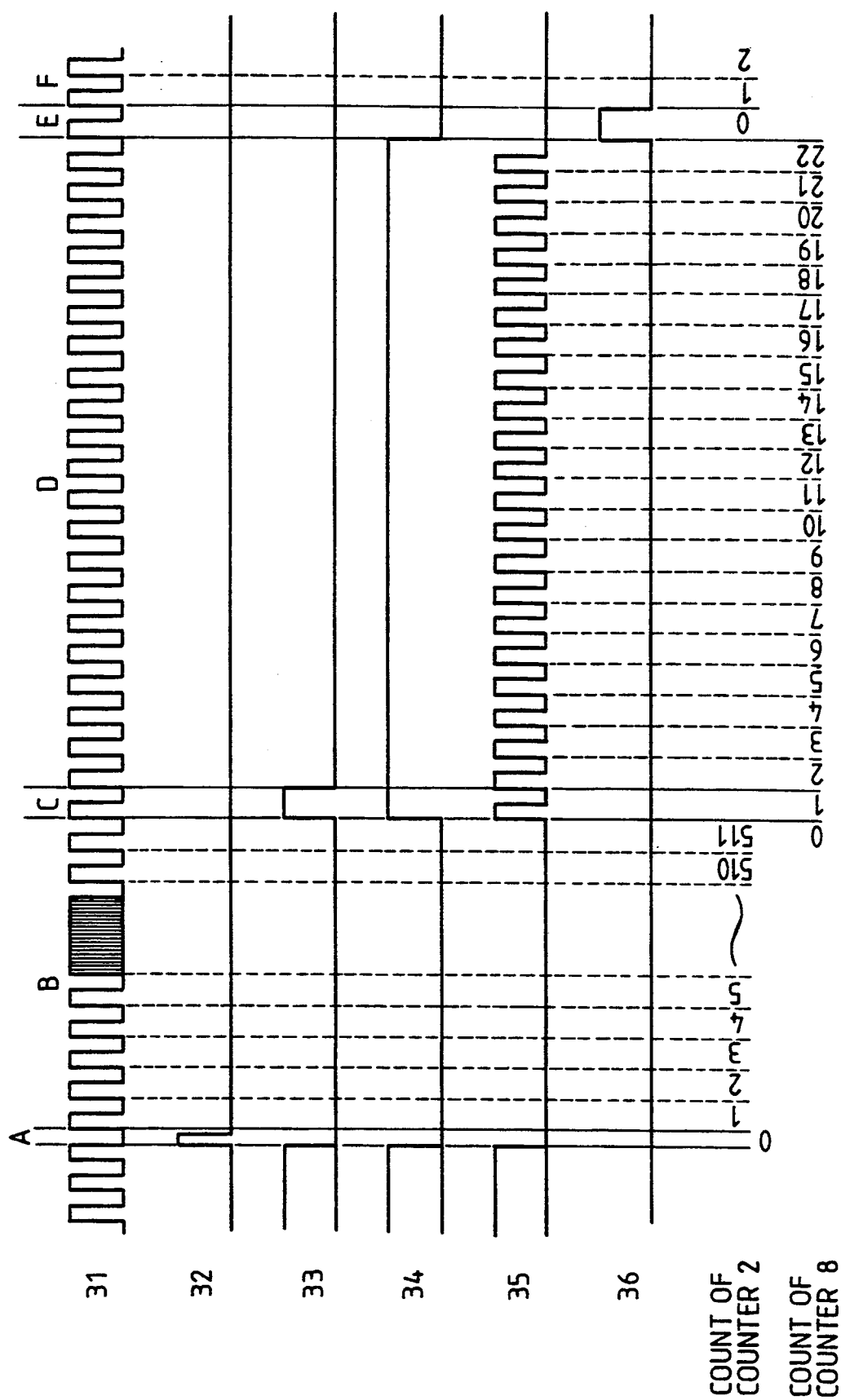
FIG. 2 is a timing chart showing timings from a signal generator to a magnitude comparator of the vibration driven motor driving circuit according to one embodiment of the present invention.

A method of controlling the frequency of the signals to be applied to the vibration driven motor 23 in the circuit described above will be described below. Assuming that the oscillation frequency of the signal generator 1 is 72 MHz, since the signal period is about 13.889 ns, about 7.0972 μs are required until the 9-bit counter 2 counts 511, and outputs an overflow signal onto the signal line 33. If the output value from the ports PD0 to PD7 of the microcomputer 9 is "1", the magnitude comparator 10 outputs onto the signal line 36 a signal indicating that data coincide with each other when the count value of the 8-bit counter 8 becomes 1. Therefore, after an elapse of about 13.889 ns since the 9-bit counter 2 outputs the overflow signal onto the signal line 33, the magnitude comparator 10 outputs the signal indicating that the data coincide with each other onto the signal line 36. After an elapse of 7.1111 μs since the 9-bit counter 2 was reset and restarted the counting operation, the state E in FIG. 2 is attained. The signals are input to the clock terminal CLK of the D-F/F 12 at a period of 7.125 μs, and the Q and $\overline{Q}$ outputs of the D-F/F 12 are inverted. Since these outputs are inverted at every 7.1111 μs, the frequency is about 70.3125 kHz, and the frequency of the driving signals to be applied to the vibration driven motor 23 is ½ the above frequency, i.e., about 35.156 kHz.

When the output value from the ports PD0 to PD7 of the microcomputer 9 is "2", every time the 8-bit counter 8 counts 2 after the 9-bit counter 2 counts 511, a clock signal is input to the clock terminal CLK of the D-F/F 12. The clock period in this case is 7.1250 μs, the frequency of the output signal from the D-F/F 12 is about 70.175 kHz, and the frequency of the driving signals to be applied to the vibration driven motor 23 is about 35.088 kHz. When the output value from the ports PD0 to PD7 of the microcomputer 9 is "127", every time the 8-bit counter 8 counts 127 after the 9-bit counter 2 counts 511, a clock signal is input to the clock terminal CLK of the D-F/F 12. The clock period in this case is 8.8611 μs, the frequency of the output signal from the D-F/F 12 is about 56.426 kHz, and the frequency of the driving signals to be applied to the vibration driven motor 23 is about 28.213 kHz.

Note that the microcomputer 9 sequentially increases the output value of ports PD0 to PD7 from 0 from the beginning of the motor driving operation in a time-serial manner.

In this manner, the period of the clock to be input to the clock terminal CLK of the D-F/F 12 is changed by changing the output value of ports PD0 to PD7 of the microcomputer 9, thereby changing the driving frequency of the signals to be applied to the vibration driven motor. The microcomputer 9 detects the driving speed of the vibration driven motor 23 using a vibration driven motor rotation speed detection means (not shown), and controls the speed of the vibration driven motor by changing the output value of ports PD0 to PD7 according to the driving speed after the motor is driven.

Figure 9:
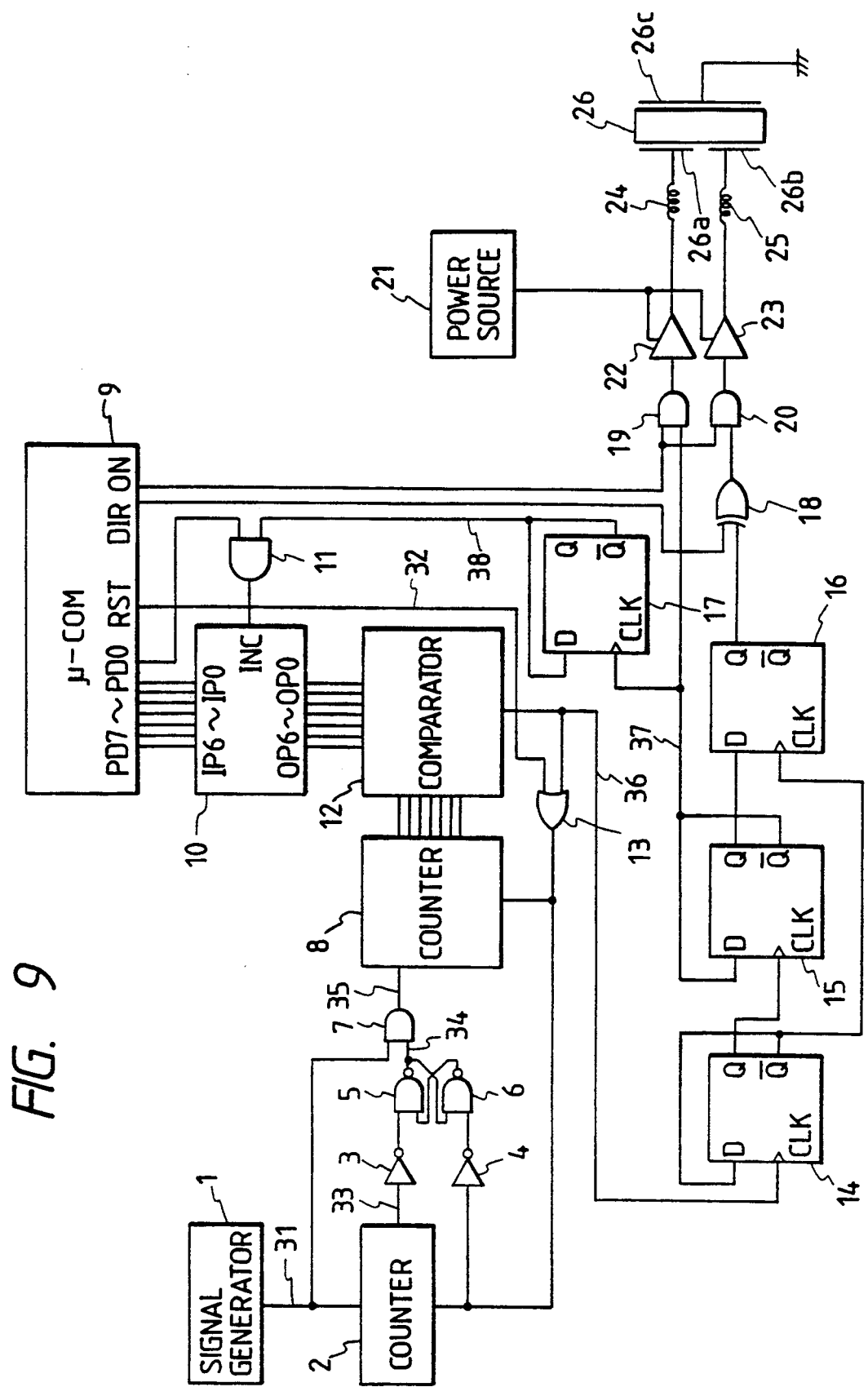
FIG. 9 is a circuit diagram of a vibration driven motor driving circuit according to another embodiment of the present invention.

FIG. 9 shows an arrangement according to another embodiment of the present invention. A circuit shown in FIG. 9 includes a signal generator 1 for generating a fixed high-frequency signal, an 8-bit counter 2 for receiving the high-frequency signal generated by the signal generator 1, inverters 3 and 4, 2-input NAND gates 5 and 6 which constitute an RS-F/F circuit, a 2-input AND gate 7, a 7-bit counter 8 connected to the 2-input AND gate 7, a microcomputer 9 for controlling the driving operation of a vibration driven motor, an adder 10 for adding 7-bit data input at terminals IP0 to IP6 to 1-bit data input at a terminal INC, and outputting the sum of terminals OP0 to OP6 as 7-bit data, a 2-input AND gate 11, a magnitude comparator 12 for comparing the data input from the adder 10 and the 7-bit counter 8, an OR gate 13 for receiving the output from the magnitude comparator 12 and the output from the RST terminal of the microcomputer 9, D-F/Fs 14, 15, 16, and 17, an EX-OR gate 18, 2-input AND gates 19 and 20, a high-voltage power source 21 for driving the vibration driven motor, power amplifiers 22 and 23 for driving the vibration driven motor, matching coils 24 and 25 for driving the vibration driven motor, and a vibration driven motor 26.

The operation of the vibration driven motor driving circuit of this embodiment with the above arrangement will be described below.

The signal generator 1 starts oscillation when the circuit receives a power source voltage. In this case, the oscillation frequency is assumed to be 36 MHz, and this signal is input to the 8-bit counter 2 and the AND gate 7 through a signal line 31. When the microcomputer 9 for controlling the vibration driven motor outputs a High-level signal as a reset signal from its RST terminal, the reset signal is supplied to the 8-bit counter 2, the RS-F/F circuit (NAND gates 5 and 6), and the 7-bit counter 8 through the OR gate 13 via a signal line 32. Thus, the count values of the 8-bit counter 2 and the 7-bit counter 8 are reset to "0", and the output from the NAND gate 5 constituting the RS-F/F circuit goes to Low level. The states of respective signals at this time are indicated by a state A in FIG. 10. When the reset signal RST from the microcomputer 9 goes to Low level, and the signal from the signal generator 1 goes from Low level to High level, the 8-bit counter 2 starts a counting operation, and keeps counting until the count value reaches 255. At this time, since an output 34 from the RS-F/F circuit is at Low level, the output from the AND gate 7 is at Low level. Since no clock is input to the 7-bit counter 8, the count value of the 7-bit counter is kept set to be "0". The states of respective signals at this time are indicated by a state B in FIG. 10.

A case will be described below wherein the signal 31 from the signal generator 1 goes from Low level to High level when the count value of the 8-bit counter is 255. When the signal input from the signal generator 1 to the 8-bit counter goes from Low level to High level, the 8-bit counter overflows, and outputs a carry signal onto a signal line 33. This signal is a positive logic signal. When the carry signal 33 is input to the NAND gate 5 constituting the RS-F/F circuit through the inverter 3, the output signal 34 from the NAND gate 5 constituting the RS-F/F circuit goes to High level. For this reason, since the output from the AND gate 7 becomes the AND result of the output signal 31 from the signal generator 1 and the output signal 34 from the NAND gate 5 constituting the RS-F/F circuit, the same signal as the output signal 31 from the signal generator 1 is output onto a signal line 35, and is input to the 7-bit counter 8. The states of respective signals at this time are indicated by a state C in FIG. 10. The 7-bit counter 8 starts a counting operation since it receives a count clock signal. The 7-bit counter 8 outputs the count value as 7-bit parallel signals, and these signals are input to the magnitude comparator 12. The states of respective signals at this time are indicated by a state D in FIG. 10.

Assuming that the output value from ports PD0 to PD7 of the microcomputer 9 for controlling the vibration driven motor is 46, since the output from the port PD0 is at Low level, the output from the AND gate 11 goes to Low level, and the adder 10 receives a value from the upper 7-bit ports PD1 to PD7 of the output value "46" from the ports PD0 to PD7 of the microcomputer 9 at its terminals IP0 to IP6. In this case, the value input to the terminals IP0 to IP6 is "23", ½ the output value "46" from the ports PD0 to PD7 of the microcomputer 9. In addition, since the input at the terminal INC is at Low level, the adder 10 outputs the same value "23" as that input to its terminals IP0 to IP6.

At this time, when the count value of the 7-bit counter 8 becomes 23, the two inputs (the output from the 7-bit counter 8 and the output from the adder 10 of the magnitude comparator 12 become equal to each other, and a signal indicating that data coincide with each other is output onto a signal line 36. This signal is a positive logic signal, and goes from Low level to High level when data coincide with each other. The states of respective signals at this time are indicated by a state E in FIG. 10. When the signal on the signal line 36 goes from Low level to High level, the 8-bit counter 2, the 7-bit counter 8, and the RS-F/F circuit are reset through the OR gate 13. Thus, the 8-bit counter 2, the 7-bit counter 8, and the RS-F/F circuit return to the same initial state as that when the microcomputer 9 outputs a reset signal, and a high-level signal is input to the clock terminal of the D-F/F 14. The states of respective signals at this time are indicated by a state F in FIG. 10. In this manner, the circuit described above repeats the states B to F in FIG. 10, and every time the count value of the 7-bit counter 8 coincides with the data output from the ports PD0 to PD6 of the microcomputer 9, the output from the magnitude comparator 12 goes from Low level to High level, and a high-level clock is input to the clock input terminal of the D-F/F 14.

Figure 11:
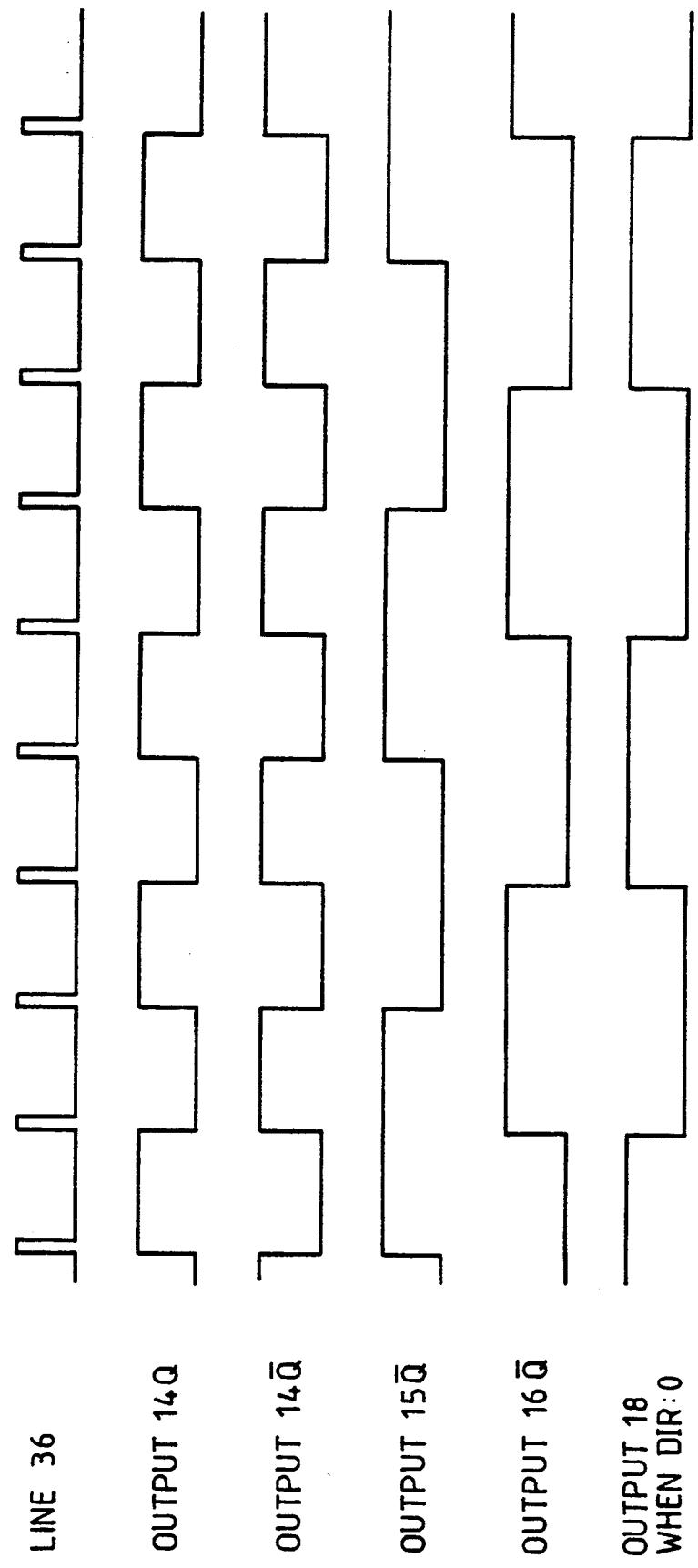
FIG. 11 is a timing chart showing timings from an output of the magnitude comparator for generation of a vibration driven motor driving signal of the vibration driven motor driving circuit according to the embodiment of the present invention shown in FIG. 9.

The operation of the D-F/Fs 14, 15, and 16 will be described below with reference to the timing chart shown in FIG. 11. Every time a high-level signal is input to the clock signal terminal CLK of the D-F/F 14, the D-F/F 14 inverts its Q (the Q output timing of the D-F/F 14 in FIG. 11) and $\overline{Q}$ (the $\overline{Q}$ output timing of the D-F/F 14 in FIG. 11) outputs. For this reason, high-level clocks are alternately input to clock input terminals CLK of the D-F/Fs 15 and 16. Every time the high-level clock is input, the D-F/Fs 15 and 16 invert their Q and $\overline{Q}$ outputs, as indicated by the Q output timings of the D-F/Fs 15 and 16 in FIG. 11. The Q outputs from the D-F/Fs 15 and 16 are signals having the same frequency, and a phase difference in which the phase of the Q output from the D-F/F 16 is delayed by 90° from that of the Q output from the D-F/F 15. At this time, when the output from the DIR terminal of the microcomputer 9 is at Low level, the output from the EX-OR gate 18 becomes the same as the Q output from the D-F/F 16; when the output from the DIR terminal of the microcomputer 9 is at High level, the EX-OR gate 18 outputs a signal obtained by inverting the Q output from the D-F/F 16 (i.e., a signal having the same frequency as that of the D-F/F 15, and a phase advanced from that of the D-F/F 15 by 90°, as shown in FIG. 11). The two signals having the same frequency and ±90° phases are respectively input to the AND gates 19 and 20. When a High-level signal is output from the ON terminal of the microcomputer 9, the AND gates 19 and 20 output the input signals; when a Low-level signal is output from the ON terminal, the outputs from the AND gate 19 and 20 go to Low level.

The two signals output from the AND gates 19 and 20, and having the same frequency and a phase difference therebetween are input to the power amplifiers using the high-voltage power source 21 (about 30 V) as a power source, and are amplified to electric power necessary for driving the vibration driven motor 26. The amplified signals having the same frequency and a phase difference therebetween are applied to piezoelectric elements (electro-mechanical energy converting elements) 26a and 26b for driving the vibration driven motor through the matching coils 24 and 25 for driving the vibration driven motor. When these signals have the frequency capable of driving the vibration driven motor 26, the vibration driven motor 26 is rotated.

In order to control the driving operation of the vibration driven motor 26, the rotation speed must be changed by changing the driving frequency of the signals to be applied to the vibration driven motor.

A method of controlling the frequency of the signals to be applied to the vibration driven motor 26 in the circuit described above will be described below. Assuming that the oscillation frequency of the signal generator 1 is 36 MHz, the signal period is about 27.778 ns. For this reason, about 7.08 μs are required until the 8-bit counter counts 255 and outputs an overflow signal onto the signal line 33. When the output value from the ports PD0 to PD7 of the microcomputer 9 is "2", the output from the adder 10 becomes "1", and the magnitude comparator 12 outputs a signal indicating that data coincide with each other onto the signal line 36 when the count value of the 7-bit counter becomes "1". Thus, after an elapse of 27.778 ns since the 8-bit counter 2 outputs the overflow signal onto the signal line 33, the magnitude comparator 12 outputs the signal indicating that data coincide with each other onto the signal line 36.

Figure 10:
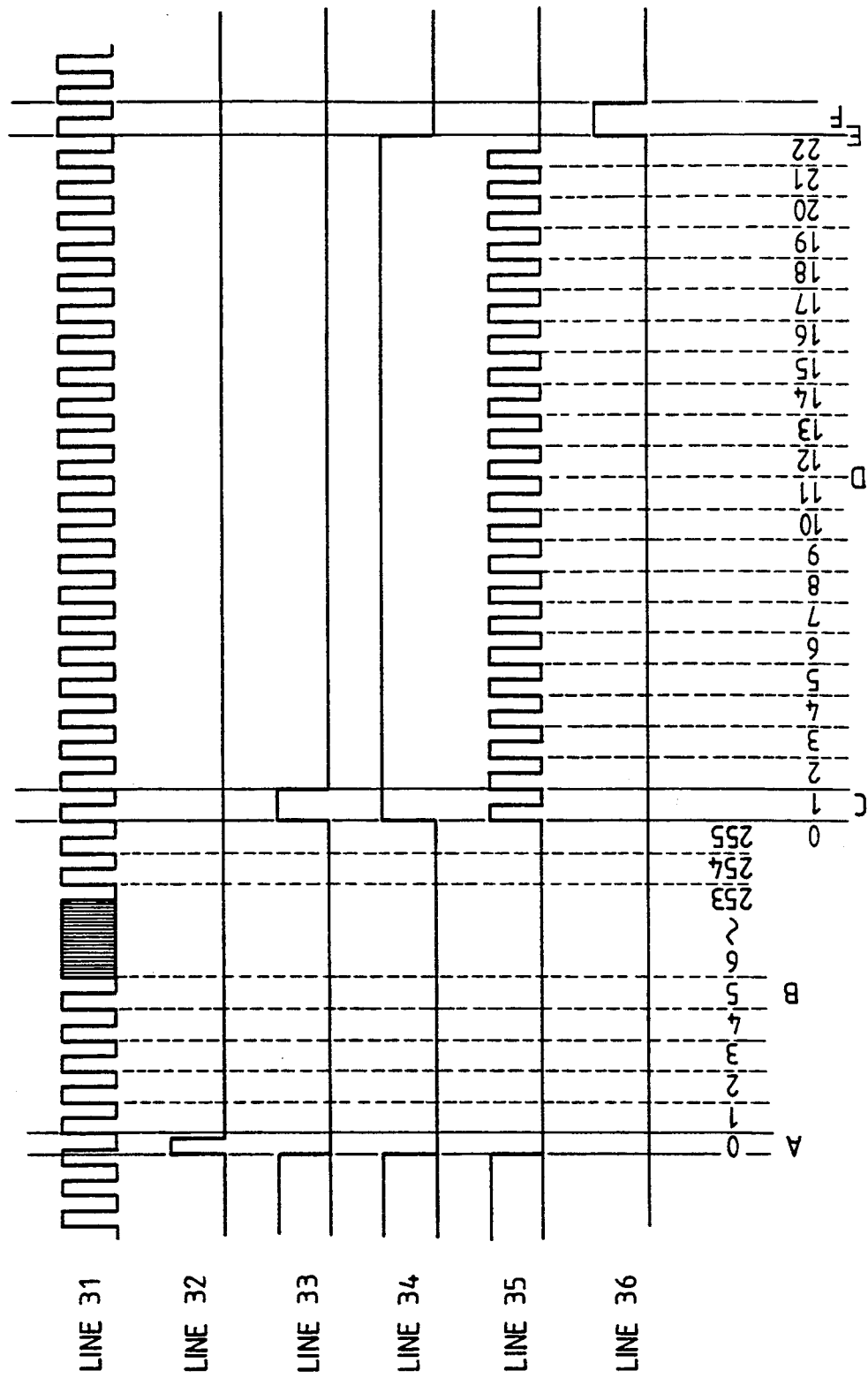
FIG. 10 is a timing chart showing timings from the signal generator to a magnitude comparator when a PD0 output of a microcomputer 9 is 0 in the vibration driven motor driving circuit according to the embodiment of the present invention shown in FIG. 9.

Therefore, after an elapse of 7.1111 μs since the 8-bit counter was reset and restarted the counting operation, the state E shown in FIG. 10 is attained, and a signal is input to the clock terminal CLK of the D-F/F 14 at a period of 7.1111 μs, thereby inverting the Q and $\overline{Q}$ outputs from the D-F/F 14. Since this output is inverted at every 7.1111 μs, the frequency is about 70.3125 kHz, and the frequency of the driving signals to be applied to the vibration driven motor 26 is ½ this frequency, i.e., about 35.156 kHz.

When the output value from the ports PD0 to PD7 of the microcomputer 9 is "4", every time the 7-bit counter 8 counts 2 after the 8-bit counter 2 counts 255, a clock signal is input to the clock terminal CLK of the D-F/F 14. The clock period in this case is 7.1389 μs, the frequency of the output signal from the D-F/F 14 is about 70.039 kHz, and the frequency of the driving signal to be applied to the vibration driven motor 26 is about 35.019 kHz.

When the output value from the ports PD0 to PD7 of the microcomputer 9 is "130", every time the 7-bit counter 8 counts 65 after the 8-bit counter 2 counts 255, a clock signal is input to the clock terminal CLK of the D-F/F 14. The clock period in this case is 8.9167 μs, the frequency of the output signal from the D-F/F 14 is about 56.075 kHz, and the frequency of the driving signal to be applied to the vibration driven motor 26 is about 28.037 kHz.

In this manner, the period of the clock input to the clock terminal CLK of the D-F/F 14 is changed by changing the output value from the ports PD0 to PD7 of the microcomputer 9, thereby changing the driving frequency of the signals to be applied to the vibration driven motor.

In the above description, the output from the port PD0 of the microcomputer 9 is "0" (Low). A case will be described below with reference to FIG. 12 wherein the output from the port PD0 of the microcomputer 9 is "1" (High). Assuming that the output value from the ports PD0 to PD7 of the microcomputer 9 is "47", and the $\overline{Q}$ output from the D-F/F 17 is "0" (Low) (a state A in FIG. 12), since the output from the AND gate 11 becomes "0" (Low) regardless of the state of the output from the port PD0 of the microcomputer 9, the adder 10 receives a value "23", $\frac{1}{2}$ the output value from the ports PD0 to PD7 of the microcomputer 9 at the terminals IP0 to IP6, and also receives "0" (Low) at the terminal INC. For this reason, the output value from the terminals OP0 to OP6 becomes "23", and the operation at this time is the same as that when the output value from the ports PD0 to PD7 is "46", as has already been described above with reference to FIG. 10. Thus, a "1" (High) signal is output onto the signal line 36, and the signals transit from the state A in FIG. 12 to a state B in FIG. 12.

Figure 12:
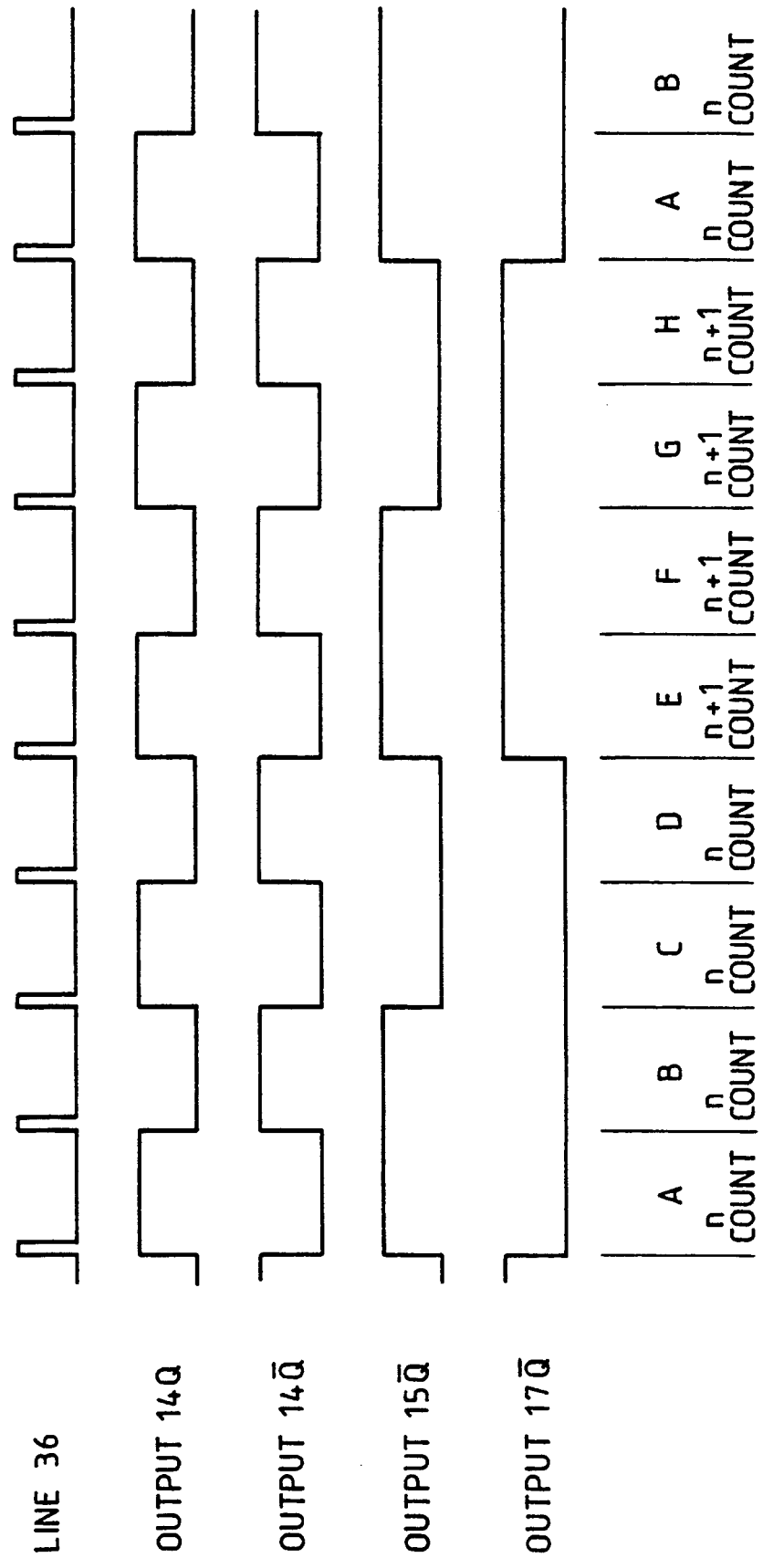
FIG. 12 is a timing chart showing timings when the PD0 output of the microcomputer 9 is 1 in the vibration driven motor driving circuit according to the embodiment of the present invention shown in FIG. 9.

In the state B in FIG. 12, since the $\overline{Q}$ output from the D-F/F 17 is "0" (Low), when the count value of the 7-bit counter becomes "23" as in the previous state, the signals transit from the state B in FIG. 12 to a state C in FIG. 12, and the same operation is repeated until a state E in FIG. 12 is attained. In the state E in FIG. 12, since the $\overline{Q}$ output from the D-F/F 17 becomes "1" (High), and the output from the port PD0 of the microcomputer 9 is "1" (High), the output from the AND gate 11 goes to "1" (High) level. Thus, since a value "23", $\frac{1}{2}$ the output value "47" from the microcomputer 9 is input to the terminals IP0 to IP6 of the adder 10, and a "1" (High) signal is input to the terminal INC, the output value from the terminals OP0 to OP6 of the adder 10 becomes "24".

Figure 13:
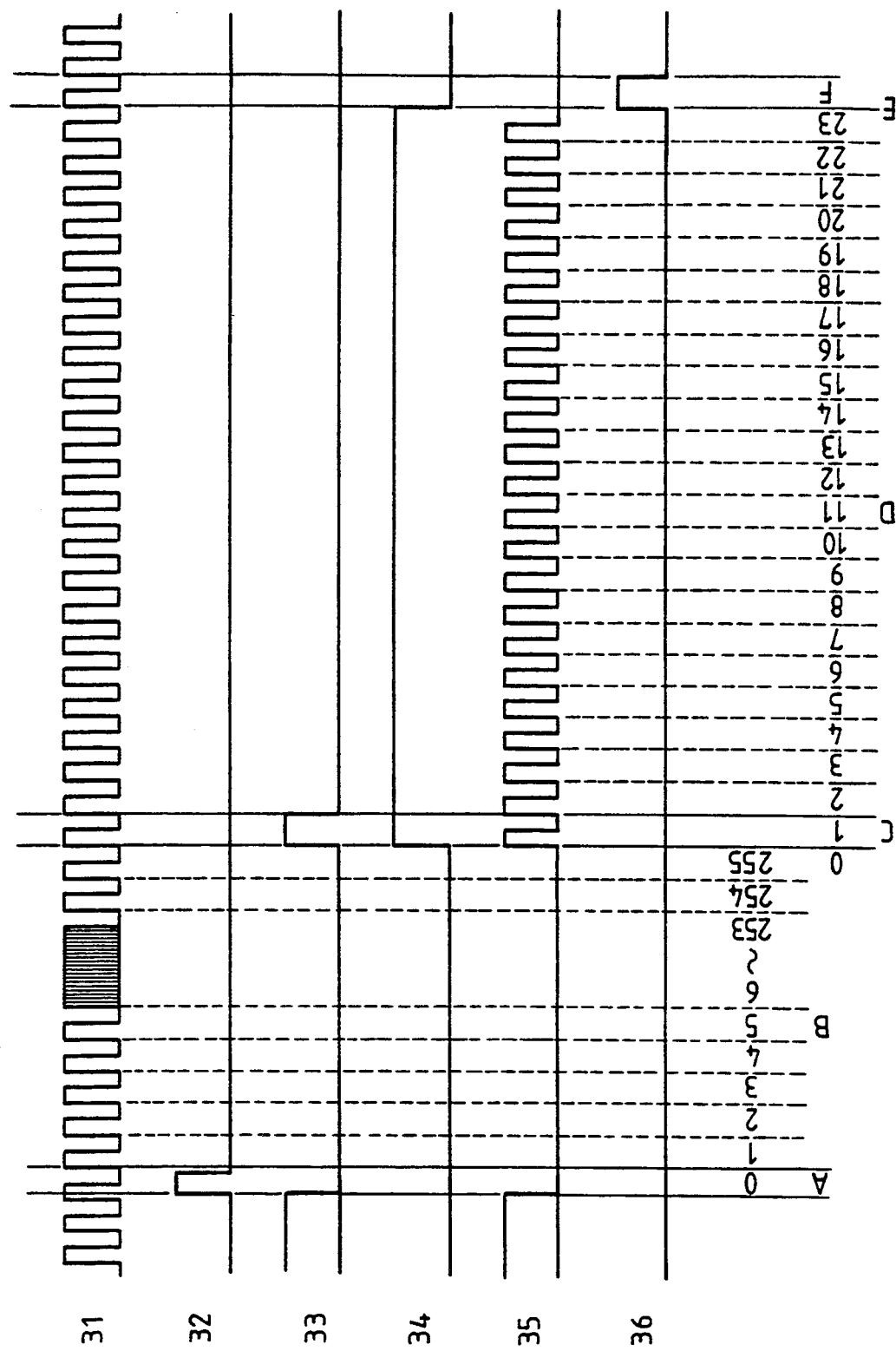
FIG. 13 is a timing chart showing timings from the signal generator to the magnitude comparator when the PD0 output of the microcomputer 9 is 1 in the vibration driven motor driving circuit according to the embodiment of the present invention shown in FIG. 9.

Operations at this time are shown in states E and F in FIGS. 12 and 13. In this state, when the output from the 7-bit counter 8 becomes "24", a High-level signal is output onto the signal line 36. For this reason, the time until the Q and $\overline{Q}$ outputs from the D-F/F 14 are inverted is prolonged by one oscillation period of the signal generator 1 as compared to a case wherein the $\overline{Q}$ output from the D-F/F 17 is "0" (Low). The state of the inverting period longer by one clock continues for four periods from the state E in FIG. 12 to a state H in FIG. 12. Thereafter, the states of the signals changed to the state A in FIG. 12. For this reason, the period of the Q and $\overline{Q}$ outputs from the D-F/F 17 is repetitively prolonged and shortened by one oscillation period of the signal generator 1 period by period. Since the output from the D-F/F 17 has the same frequency as that of the signal for driving the vibration driven motor 26, the vibration driven motor 26 is driven by the signal whose frequency is changed period by period. Since the response time of the vibration driven motor 26 is sufficiently longer than this driving frequency, the vibration driven motor 26 can be driven as if it were driven at an intermediate frequency between two frequencies whose periods are changed period by period.

A method of controlling the frequency of the signal to be applied to the vibration driven motor 26 in the circuit described above will be described below. As described above, since the oscillation frequency of the signal generator 1 is 36 MHz, the signal period is about 27.778 ns. If the output value from the ports PD0 to PD7 of the microcomputer 9 is "3", when the $\overline{Q}$ output from the D-F/F 17 is "0" (Low), the period of the High-level signal output from the magnitude comparator 12 onto the signal line 36 is 7.1389 $\mu$s, and the frequency of the Q and $\overline{Q}$ outputs from the D-F/F 15 for driving the vibration driven motor 26 is 35.019 kHz. When the $\overline{Q}$ output from the D-F/F 17 is "1" (High), the period of the High-level signal output from the magnitude comparator 12 onto the signal line 36 is 7.1667 $\mu$s, and the frequency for driving the vibration driven motor 26 is 34.884 kHz.

For this reason, since the driving signals of 35.019 kHz and 34.884 kHz are alternately applied to the vibration driven motor 26, this is equivalent to a case wherein a driving signal at about 34.952 kHz at an almost intermediate frequency of the two frequencies is applied to the vibration driven motor 26. When the output value from the ports PD0 to PD7 of the microcomputer 9 is "131", the driving frequency of the vibration driven motor 26 is alternately set at 28.037 kHz and 27.950 kHz period by period, and in this case, the vibration driven motor 26 is substantially driven at 27.994 kHz.

In this manner, since the driving frequency of the vibration driven motor can be changed by changing the output value from the output ports PD0 to PD7 of the microcomputer 9 for controlling the vibration driven motor, the microcomputer 9 for controlling the vibration driven motor changes the output value from the ports PD0 to PD7 by detecting the driving speed of the vibration driven motor 26 using a vibration driven motor rotation speed detection means (not shown), thereby controlling the speed of the vibration driven motor.

Note that the output value from the ports PD0 to PD7 of the microcomputer 9 is sequentially increased from the beginning of the driving operation.

Figure 14:
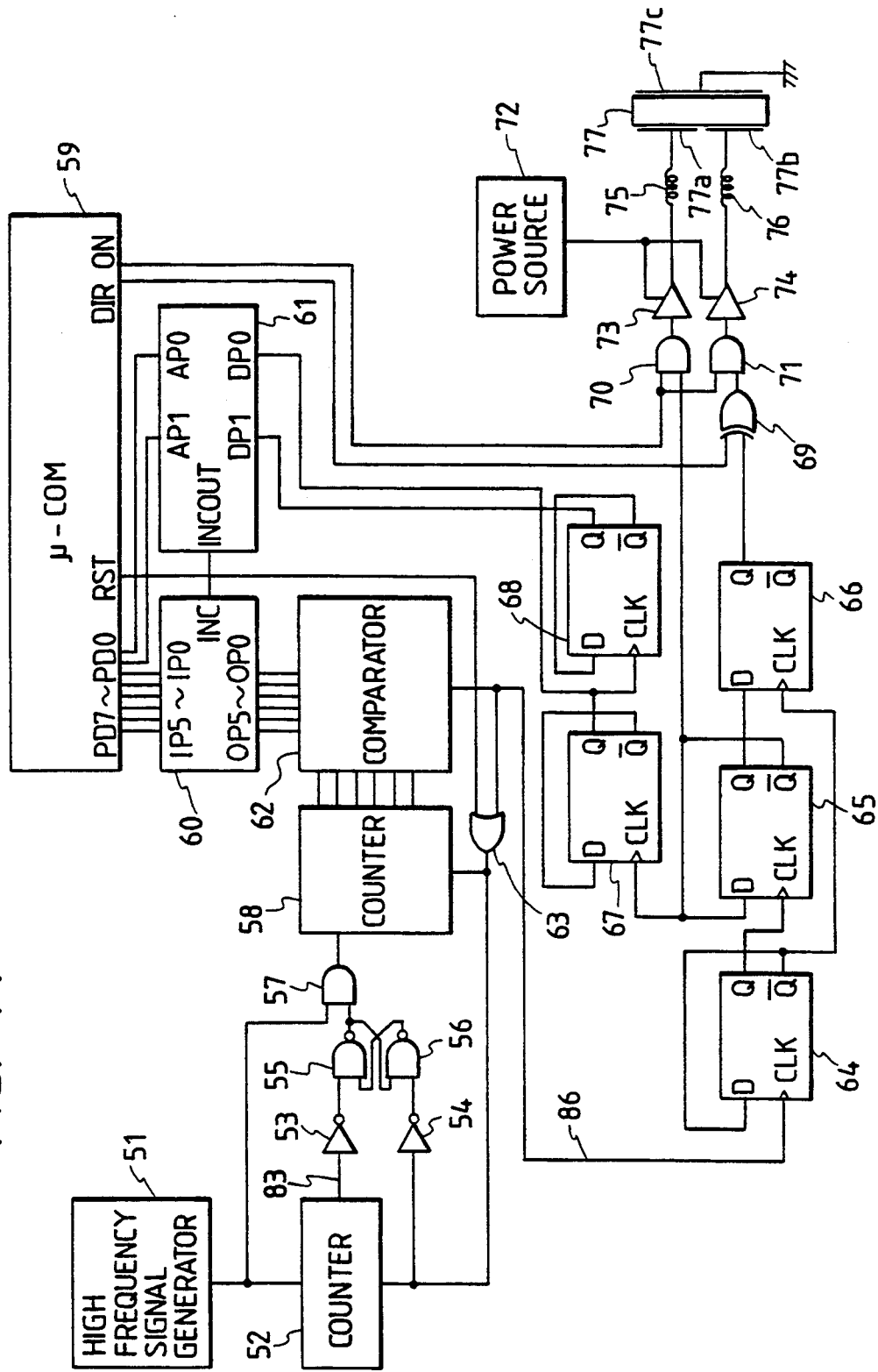
FIG. 14 is a circuit diagram of a vibration driven motor driving circuit according to still another embodiment of the present invention.

FIG. 14 shows an arrangement according to still another embodiment of the present invention. A circuit shown in FIG. 14 includes a high-frequency signal generator 51 for generating a fixed high-frequency signal, a 7-bit counter 52 for receiving the high-frequency signal generated by the signal generator 51, inverters 53 and 54, 2-input NAND gates 55 and 56, which constitute an RS-F/F, a 2-input AND gate 57, a 6-bit counter 58 connected to the 2-input AND gate 57, a microcomputer 59 for controlling a driving operation of a vibration driven motor, an adder 60 for adding 6-bit data input at terminals IP0 to IP5 and 1-bit data input at a terminal INC, and outputting the sum as 6-bit data from terminals OP0 to OP5, a data selector 61 for selecting one of data at terminals DP0 and DP1 according to data input at terminals AP0 and AP1, and outputting the selected data to a terminal INCOUT, a magnitude comparator 62 for comparing the data input from the adder 60 and the 6-bit counter 58 and for, when the two data coincide with each other, for outputting a High-level signal, an OR gate 63 for receiving the output from the magnitude comparator 62 and the output from the RST terminal of the microcomputer 59, D-F/Fs 64, 65, 67, and 68, an EX-OR gate 69, 2-input AND gates 70 and 71, a high-voltage power source 72 for driving the vibration driven motor, power amplifiers 73 and 74 for driving the vibration driven motor, matching coils 75 and 76 for driving the vibration driven motor, and a vibration driven motor 77.

The operation of the vibration driven motor driving circuit of this embodiment with the above arrangement will be described below. When the circuit receives a power source voltage, the signal generator 51 starts oscillation as in the embodiment described above. Note that the oscillation frequency is 18 MHz. When the microcomputer 59 outputs a High-level signal as a reset signal from the RST terminal, the 7-bit counter 52, the RS-F/F constituted by the NAND gates 55 and 56, and the 6-bit counter 58 are reset, and the count values of these counters become "0". When the signal output from the RST terminal of the microcomputer 59 goes to Low level, the reset state is canceled. Then, the 7-bit counter 52 starts a counting operation as in the embodiment described above, and keeps counting until its count value reaches 127. When the count value exceeds 127, the counter 52 overflows, and outputs a carry signal onto a signal line 83. In response to this signal, the output from the RS-F/F constituted by the NAND gates 55 and 56 is inverted, and a clock is supplied to the 6-bit counter 58. The 6-bit counter starts counting, and outputs a count value as 6-bit parallel data. This output value is input to the magnitude comparator 62.

Figure 15:
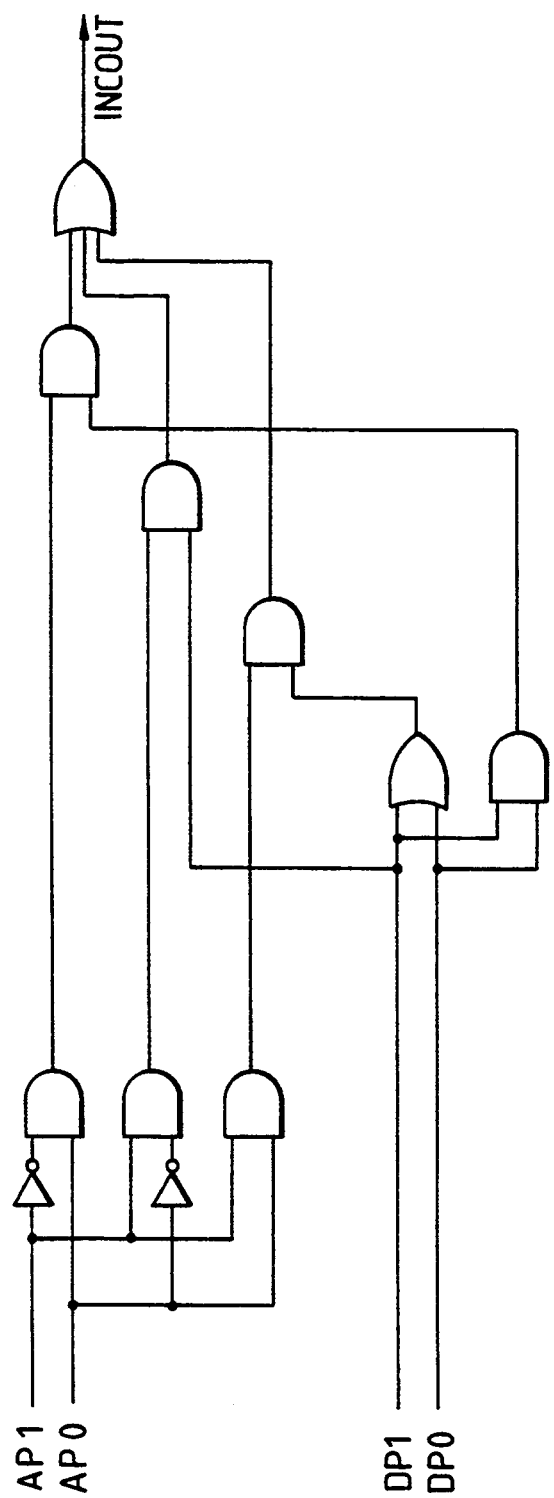
FIG. 15 is a circuit diagram of a data select circuit of the vibration driven motor driving circuit according to the embodiment of the present invention shown in FIG. 14.
Figure 16:
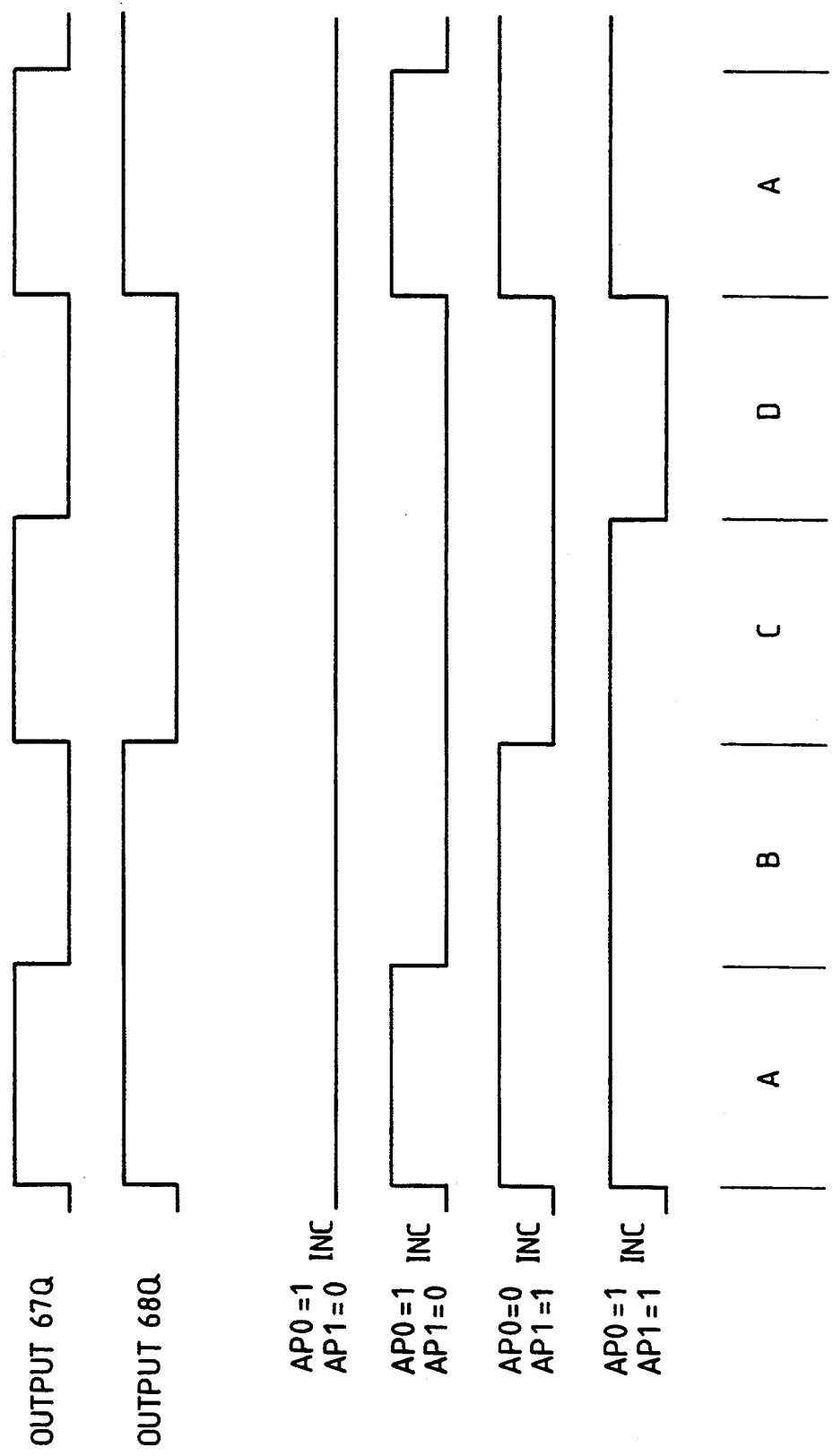
FIG. 16 is a timing chart showing timings of the vibration driven motor driving circuit according to the embodiment of the present invention shown in FIG. 14.

The operation of the data selector 61 will be described below. FIG. 15 shows the internal arrangement of the data selector 61, and FIG. 16 is a timing chart thereof. The data selector 61 is constituted by inverters, AND gates, and OR gates. When both the inputs AP0 and AP1 are at "0" (Low) level (0 in decimal notation), the output INCOUT goes to "0" (Low) level independently of the inputs DP0 and DP1. When the input AP0 is at "1" level and the input AP1 is at "0" level (1 in decimal notation), the output INCOUT goes to "1" (High) level only when both the inputs DP0 and DP1 are at "1" (High) level; otherwise, the output INCOUT goes to "0" level. When the input AP0 is at "0" level and the input AP1 is at "1" level (2 in decimal notation), the input DP1 is directly output as the output INCOUT. When both the inputs AP0 and AP1 are at "1" (High) level (3 in decimal notation), the output INCOUT goes to "1" (High) level when one of the inputs DP0 and DP1 is at "1" (High) level.

Assuming that the output value from the output terminals PD0 to PD7 of the microcomputer 59 for controlling the vibration driven motor is "48", since both the inputs AP0 and AP1 of the data selector 61 are at "0" level (Low), the output INCOUT is always at "0" (Low) level. For this reason, the input terminal INC of the adder 60 is at "0" (Low) level, and the input terminals IP0 to IP5 receive "12" as a value ¼ the output value from the output terminals PD0 to PD7 of the microcomputer 59. For this reason, the output value from the output terminals OP0 to OP5 of the adder 60 becomes "12", and this value is input to the magnitude comparator 62. When the count value of the 6-bit counter 58 reaches "12", the magnitude comparator 62 outputs a High-level signal onto a signal line 86 as in the above embodiment so as to invert the output from the D-F/F 64, and to reset the 7-bit counter 52, the RS-F/F constituted by the NAND gates 55 and 56, and the 6-bit counter 58.

Upon repetition of this operation, the D-F/F 64 outputs a frequency twice the driving frequency of the vibration driven motor, and the D-F/Fs 65 and 66 form vibration driven motor driving signals having a 90° phase difference therebetween. The EX-OR gate 69 determines the driving direction of the vibration driven motor according to the state of the DIR terminal of the microcomputer 59 for controlling the vibration driven motor. When the output from the ON terminal of the microcomputer 59 for controlling the vibration driven motor is at "1" (High) level, the AND gates 70 and 71 output the vibration driven motor driving signals, and the driving signals are amplified to electric power capable of driving the vibration driven motor by the power amplifiers 73 and 74 using the high-voltage power source 72 as a power source. The amplified driving signals are applied to electrodes 77a and 77b of the vibration driven motor 77 through the matching coils 75 and 76, thereby rotating the vibration driven motor 77.

When the output value from the terminals PD0 to PD7 of the microcomputer 59 for controlling the vibration driven motor is "49", the input AP0 of the data selector 61 goes to "1" (High) level, and the input AP1 goes to "0" (Low) level. For this reason, only when both the inputs DP0 and DP1 are at "1" (High) level, the output INCOUT goes to "1" (High) level. Assuming that output terminals Q of the D-F/Fs 67 and 68 are at "0" (Low) level, since both the inputs DP0 and DP1 of the data selector 61 are at "0" level, the output INCOUT goes to "0" level. As a result, since the terminal INC of the adder 60 receives "0", and the terminals IP0 to IP5 receive "12" as a value ¼ the output value from the output terminals PD0 to PD7 of the microcomputer 59, the output value from the output terminals OP0 to OP5 of the adder 60 becomes "12", and this value is input to the magnitude comparator 62. Thus, when the count value of the 6-bit counter 58 reaches 12, the magnitude comparator 62 outputs a High-level signal onto the signal line 86, thereby inverting the output from the D-F/F 64. When this operation is repeated for three periods, the outputs from the output terminals Q of the D-F/Fs 67 and 68 go to "1" (High) level, and the output INCOUT from the data selector 61 goes to "1" (High) level. Thus, the output value from the output terminals OP0 to OP5 of the adder 60 becomes "13", and when the count value of the 6-bit counter reaches "13", the magnitude comparator 62 outputs a High-level signal onto the signal line 86, thereby inverting the output from the D-F/F 64. As a result, the period of the vibration driven motor driving signal is prolonged by one period of the oscillation signal from the signal generator 51, and its frequency is lowered. When the output from the D-F/F 64 is repetitively inverted four times, the outputs from the output terminals Q of the D-F/Fs 67 and 68 go to "0" level. When the operations described so far are defined as one cycle, the driving frequency of the vibration driven motor is increased during an interval ¾ the cycle, and it is decreased only during an interval ¼ the cycle. Therefore, the vibration driven motor 77 performs substantially the same operation as in a case wherein it is driven at a frequency near a frequency lower by about ¼ the frequency difference between the above-mentioned two frequencies than the upper frequency.

When the output value from the terminals PD0 to PD7 of the microcomputer 59 for controlling the vibration driven motor is "50", the input AP0 of the data selector 61 goes to "0" (Low) level, and the input AP1 goes to "1" (High) level. Therefore, the output INCOUT goes to "1" (High) level only when the input DP1 is at "1" (High) level. Assuming that the output from the output terminal Q of the D-F/F 68 is at "0" (Low) level, since the input DP1 of the data selector 61 is at "0" level, the output INCOUT goes to "0" level. Thus, the adder 60 receives "0" at the terminal INC, and "12" as a value ¼ the output value from the terminals PD0 to PD7 of the microcomputer 59 at the input terminals IP0 to IP5. For this reason, the output value from the output terminals OP0 to OP5 of the adder 60 becomes "12", and this value is input to the magnitude comparator 62. When the count value of the 6-bit counter 58 becomes "12", the magnitude comparator 62 outputs a High-level signal onto the signal line 86, thereby inverting the output from the D-F/F 64. When this operation is repeated for two periods, since the output from the output terminal Q of the D-F/F 68 goes to "1" (High) level, the output INCOUT from the data selector 61 goes to "1" (High) level. Therefore, the output value from the terminals OP0 to OP5 of the adder 60 becomes "13". When the count value of the 6-bit counter 58 becomes "13", the magnitude comparator 62 outputs a High-level signal onto the signal line 86, thereby inverting the output from the D-F/F 64.

In this manner, the period of the vibration driven motor driving signal is prolonged by two periods of the oscillation signal from the signal generator 51, and the frequency is lowered. When the D-F/F 64 is repetitively inverted four times, the output from the output terminal Q of the D-F/F 68 goes to "0" level. When the operations described so far are defined as one cycle, the driving frequency of the vibration driven motor is increased during an interval ½ the cycle, and it is decreased during an interval ½ the cycle. Therefore, the vibration driven motor 77 performs substantially the same operation as in a case wherein it is driven at an intermediate frequency between the above-mentioned two frequencies.

When the output value from the terminals PD0 to PD7 of the microcomputer 59 for controlling the vibration driven motor is "51", both the inputs AP0 and AP1 of the data selector 61 go to "1" (High) level, and the output INCOUT goes to "1" (High) level when one of the inputs DP0 and DP1 is at "1" (High) level. Assuming that the outputs from the D-F/Fs 67 and 68 are at "0" (Low) level, since both the inputs DP0 and DP1 of the data selector 61 are at "0" level, the output INCOUT goes to "0" level, and the adder 60 receives "0" at the terminal INC and "12" as a value ¼ the output value from the terminals PD0 to PD7 of the microcomputer 59 at the input terminals IP0 to IP5.

Therefore, the output value from the output terminals OP0 to OP5 of the adder 60 becomes "12", and this output value is input to the magnitude comparator 62. When the count value of the 6-bit counter 58 becomes "12", the magnitude comparator 62 outputs a High-level signal onto the signal line 86, thereby inverting the output from the D-F/F 64. When this operation is repeated by one period, since one of the outputs from the output terminals Q of the D-F/Fs 67 and 68 goes to "1" (High) level, the output INCOUT of the data selector 61 goes to "1" (High) level, and the output value from the terminals OP0 to OP5 of the adder 60 becomes "13". For this reason, when the count value of the 6-bit counter 58 becomes "13", the magnitude comparator 62 outputs a High-level signal onto the signal line 86, thereby inverting the output from the D-F/F 64. Thus, the period of the vibration driven motor driving signal is prolonged by one period of the oscillation signal from the signal generator 51, and the frequency is lowered. When the D-F/F 64 is repetitively inverted four times, the outputs from the output terminals Q of the D-F/Fs 67 and 68 go to "0" level. When the operations described so far are defined as one cycle, the driving frequency of the vibration driven motor is increased during an interval ¼ the cycle, and is decreased during an interval ¾ the cycle. Therefore, the vibration driven motor 77 performs substantially the same operation as in a case wherein it is driven at a frequency near a frequency lower by about ¾ the frequency difference between the above-mentioned two frequencies than the upper frequency.

Figure 17:
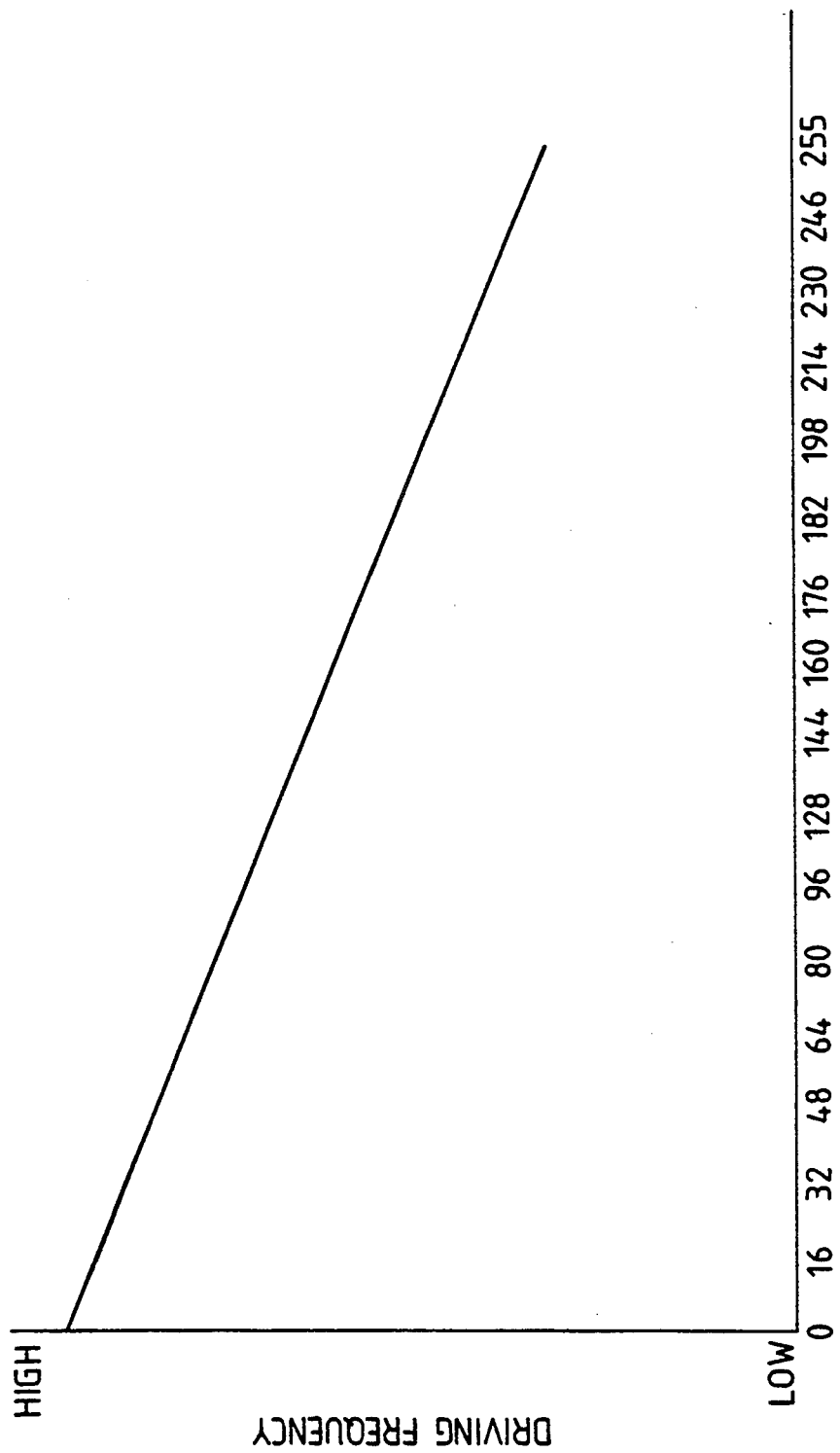
FIG. 17 is a graph showing the relationship between the output values from ports PD0 to PD7 of a microcomputer 59 and the vibration driven motor driving frequency in the vibration driven motor driving circuit according to the embodiment of the present invention shown in FIG. 14.

In the above description, the output values from the terminals PD0 to PD7 of the microcomputer 59 for controlling the vibration driven motor are "48" to "51". However, when another value is output, the vibration driven motor driving frequency in effect changes according to the output value. Therefore, as shown in FIG. 17, when the output value from the terminals PD0 to PD7 is small, the vibration driven motor driving frequency is increased; when the output value is large, the vibration driven motor driving frequency is decreased. The speed of the vibration driven motor can be controlled by changing the output value from the terminals PD0 to PD7.

Figure 18:
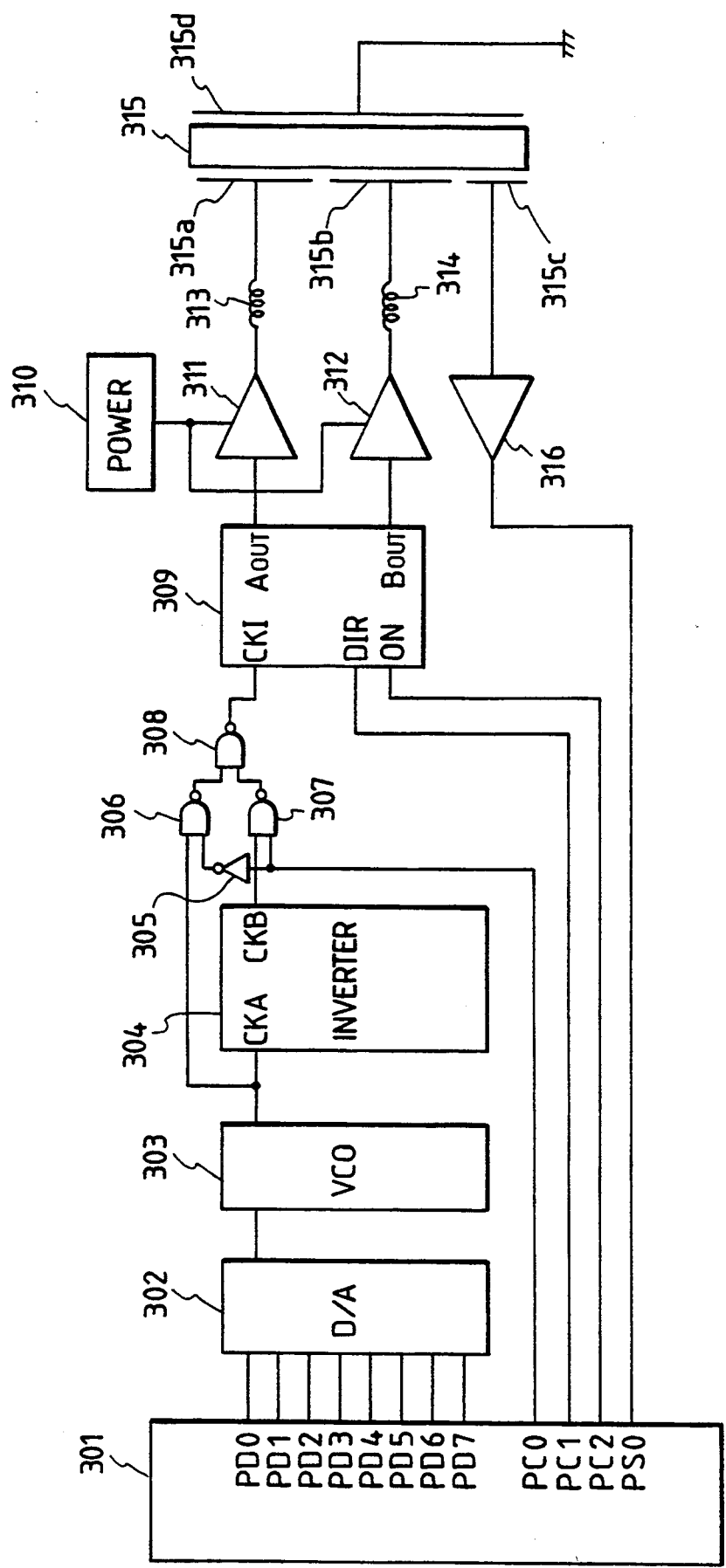
FIG. 18 is a circuit diagram of a vibration driven motor driving circuit according to still another embodiment of the present invention.

FIG. 18 is a schematic circuit diagram showing still another embodiment of the present invention. A circuit shown in FIG. 18 includes a microcomputer 301 for controlling a vibration driven motor, an 8-bit D/A converter 302, connected to the microcomputer 301, for converting an 8-bit digital signal from the microcomputer into an analog signal corresponding to one of 256 levels, a variable frequency oscillator (to be referred to as a VCO hereinafter) 303, which is connected to the 8-bit D/A converter 302, and changes its oscillation frequency according to an input voltage from the 8-bit D/A converter, a 4-frequency divider 304, connected to the VCO 303, for frequency dividing the oscillation frequency from the VCO 303 with 4, an inverter 305, connected to the microcomputer 301, for inverting an output signal from the microcomputer, a NAND gate 306, connected to the VCO 303 and the inverter 304, for inverting and outputting the signal from the VCO 303 when the output from the inverter 304 is at High level, a NAND gate 307, connected to the 4-frequency divider 304, and the microcomputer 301, for inverting and outputting the signal from the 4-frequency divider 304 when the signal from the microcomputer is at High level, and a NAND gate 308 connected to the NAND gate 306, and constituting a negative logic OR gate, which outputs a High-level signal when at least one of the outputs from the NAND gates 306 and 307 is at Low level.

The inverter 305 and the NAND gates 306 to 308 constitute a signal selector circuit for selecting one of the signal from the VCO 303 and the signal from the 4-frequency divider 304 depending on whether the signal from the microcomputer 301 is at Low or High level. The circuit shown in FIG. 18 further includes a vibration driven motor driving logic circuit 309, connected to the NAND gate 308 and the microcomputer 301, for converting the signal from the NAND gate 308 into a signal for driving the vibration driven motor according to the signal from the microcomputer 301, a voltage source 310 for generating a high voltage (about 30 V) necessary for driving the vibration driven motor, amplifiers 311 and 312, connected to the vibration driven motor driving logic circuit 309 and the power source 310, for amplifying the signal from the vibration driven motor driving logic circuit to a level necessary for driving the vibration driven motor, matching coils 313 and 314, respectively connected to the amplifiers 311 and 312, for converting the signals from the amplifiers 311 and 312 into shapes necessary for driving the vibration driven motor, a vibration driven motor 315, connected to the matching coils 313 and 314, for forming a progressive vibration wave according to the signals from the matching coils 313 and 314, and driving a moving member by the progressive vibration wave, an electrode A 315a connected to a piezoelectric member for forming the progressive vibration wave necessary for driving the motor, an electrode B 315b connected to a piezoelectric member for forming the progressive vibration wave necessary for driving the motor, a sensor electrode 315c connected to a sensor piezoelectric member for detecting a state of the progressive vibration wave generated on the vibration driven motor, a GND electrode 315d connected to a terminal GND, and a comparator 316, connected to the sensor electrode 315c of the vibration driven motor 315, for converting an analog signal from the sensor electrode into a binary digital signal.

Figure 19:
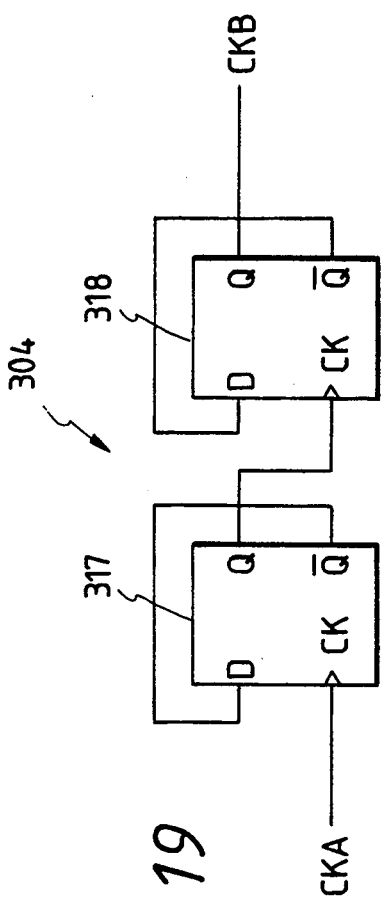
FIG. 19 is a circuit diagram showing details of a 4-frequency divider shown in FIG. 18.

FIG. 19 shows the internal arrangement of the 4-frequency divider 304 shown in FIG. 18. In FIG. 19, inverting outputs $\bar{Q}$ of D-F/Fs 317 and 318 are connected to data input terminals thereof. A clock terminal of each D-F/F receives a signal before frequency division, and each D-F/F frequency-divides the input signal with 2.

Figure 20:
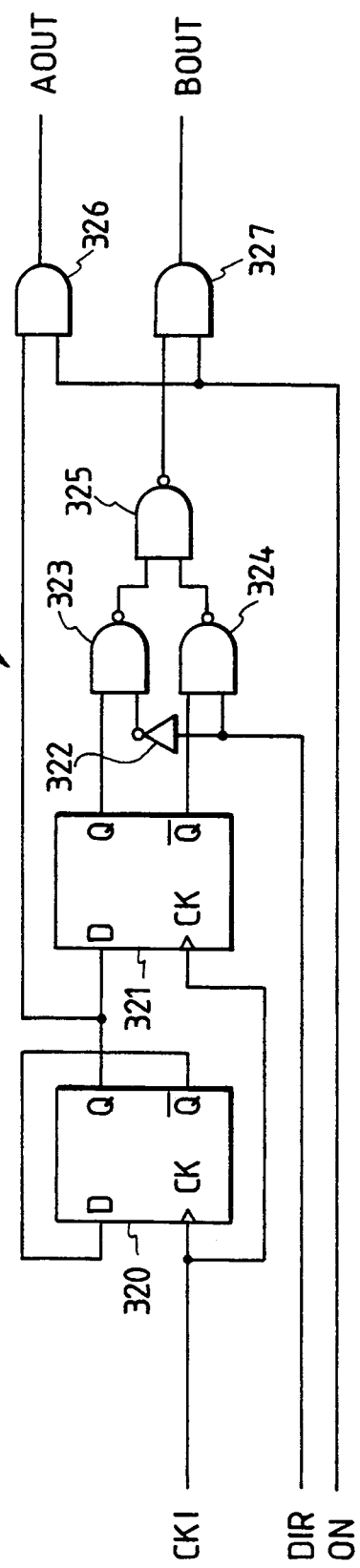
FIG. 20 is a circuit diagram showing a vibration driven motor logic circuit shown in FIG. 18.

FIG. 20 shows the arrangement of the vibration driven motor driving logic circuit 309 shown in FIG. 18. The logic circuit 309 includes a D-F/F 320 for frequency-dividing an input signal with 2, a D-F/F 321 for forming a signal having a 90° phase difference from the signal 2-frequency-divided by the D-F/F 320, and the same frequency as that of the signal, an inverter 322, and NAND gates 323 to 325. The inverter 322 and the NAND gates 323 to 325 constitute a signal selector circuit, and the signal selector circuit is enabled or disabled depending on whether the output from the D-F/F 321 is a non-inverted or inverted output. The logic circuit 309 also includes AND gates 326 and 327, respectively connected to the D-F/F 320 and the NAND gate 325, for respectively outputting the outputs from the D-F/F 320 and the NAND gate 325 to terminals AOUT and BOUT when ON signal is at High level.

The operation of this embodiment with the above arrangement will be described below.

Figure 21:
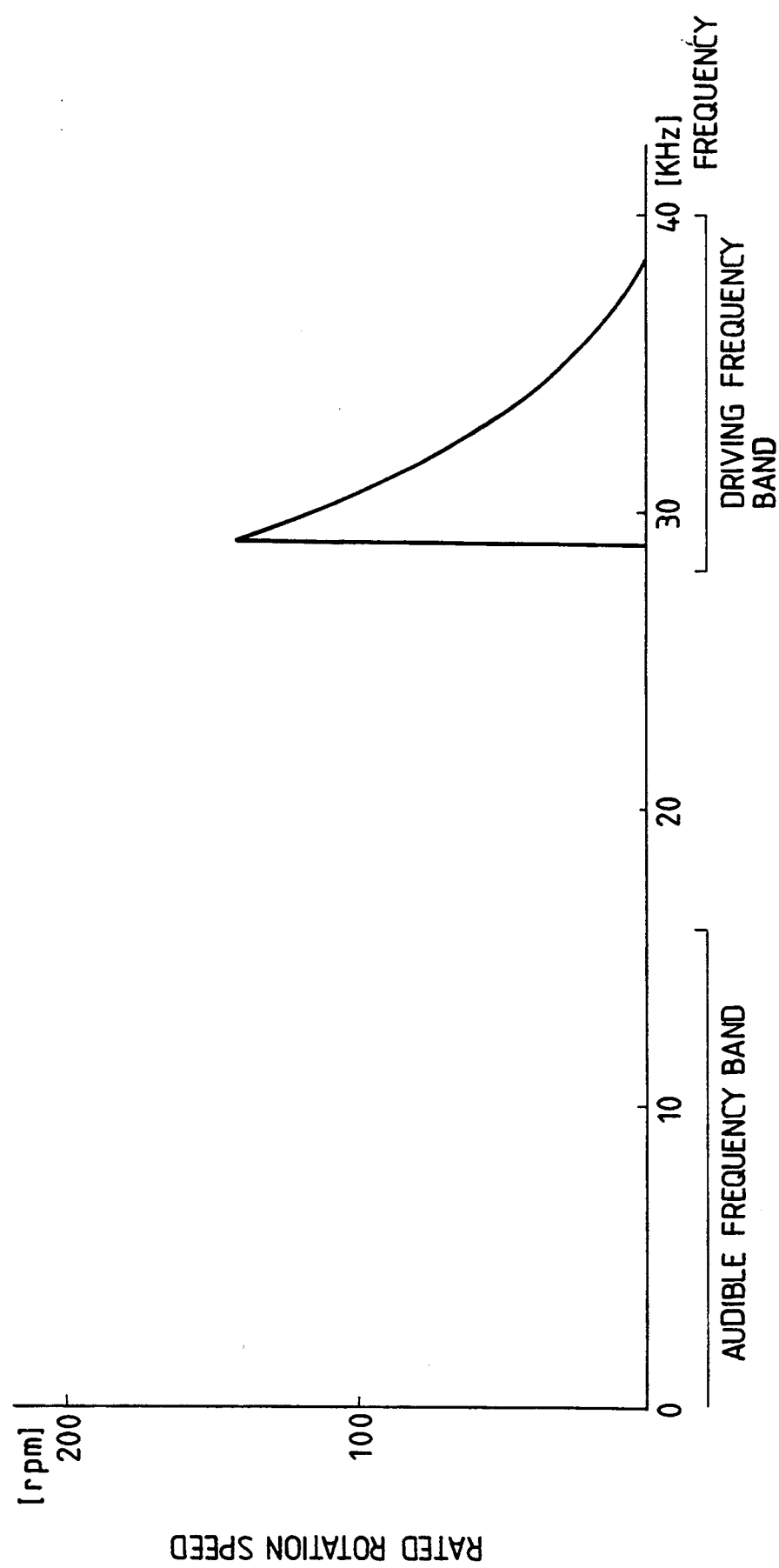
FIG. 21 is a graph showing the application frequency and the rotation speed of the vibration driven motor shown in FIG. 18.

In order to drive the vibration driven motor, in general, an ultrasonic wave at a frequency higher than an audible frequency range like a vibration driven motor driving frequency band shown in FIG. 21 is used. This is to maximally utilize no-driving noise characteristics as one characteristic feature of the vibration driven motor when the motor is driven. The microcomputer outputs 8-bit data of the driving frequency to terminals PD0 to PD7 so as to drive the vibration driven motor. The data is input to the D/A converter 302, and is converted into an analog voltage. The analog voltage is input to the VCO 303. The VCO 303 is an oscillator whose oscillation frequency changes according to an input voltage. When the analog input voltage is high, the oscillation frequency of the VCO 303 is increased; otherwise, the oscillation frequency is decreased.

The vibration driven motor has characteristics in that as the frequency is higher in the specific driving frequency band, the rotation speed is decreased; when the frequency is decreased, the rotation speed is increased, as shown in FIG. 21. Therefore, the microcomputer 301 outputs data, so that the frequency changes from a higher one to a lower one. When the vibration driven motor is driven, the output from a terminal PC0 of the microcomputer is at Low level. For this reason, a vibration driven motor frequency signal generated by the VCO 303 is input to the vibration driven motor driving logic circuit 309 through the data selector circuit constituted by the inverter 305 and the NAND gates 306 to 308. The vibration driven motor driving logic circuit 309 receives the oscillation signal from the data selector circuit, a vibration driven motor driving direction signal from a terminal PC1 of the microcomputer, and a vibration driven motor driving ON/OFF signal from a terminal PC2. When the vibration driven motor driving ON/OFF signal is at High level, and the vibration driven motor driving direction signal is at High level, the logic circuit 309 outputs a signal having a frequency ¼ the oscillation frequency of the VCO 303 from the terminal AOUT, and outputs, from the terminal BOUT, a signal having the same frequency as that of the signal output from the terminal AOUT, and having a phase advanced by 90° from that of the signal output from the terminal AOUT, thereby generating signals for driving the vibration driven motor in the normal direction. When the vibration driven motor driving ON/OFF signal is at High level, and the vibration driven motor driving direction signal is at Low level, the logic circuit 309 outputs a signal having a frequency ¼ the oscillation frequency from the terminal AOUT, and outputs, from the terminal BOUT, a signal having the same frequency as that of the signal from the terminal AOUT, and having a phase delayed by 90° from that of the signal output from the terminal AOUT, thereby forming signals for driving the vibration driven motor in the reverse direction. The two signals formed by the logic circuit 309 and having a 90° phase difference therebetween are amplified to a voltage level necessary for driving the vibration driven motor by the amplifiers 311 and 312. The amplified signals are applied to the vibration driven motor 315 through the matching coils 313 and 314 so as to form a progressive vibration wave on the vibration driven motor, thereby rotating the vibration driven motor.

A case will be described below wherein a signal tone is generated using the vibration driven motor 315.

The microcomputer 301 outputs 8-bit data of a signal tone from the terminals PD0 to PD7 like in a case wherein the vibration driven motor is driven. The 8-bit data is input to the D/A converter 302, and is converted into an analog voltage. The converter 302 outputs the analog voltage. The analog voltage is input to the VCO 303, and the VCO 303 oscillates a signal having a frequency in the same frequency band as that when the vibration driven motor is driven. The signal generated by the VCO 303 is input to the 4-frequency divider 304, and the 4-frequency divider 304 forms a signal having a frequency ¼ that of the input signal. When a signal tone is generated, since the output from the terminal PC0 of the microcomputer 301 is set at High level, the signal selector circuit constituted by the inverter 305 and the NAND gates 306 to 308 selects the signal from the 4-frequency divider 304, and inputs the selected signal to the vibration driven motor driving logic circuit 309. The frequency of this signal is ¼ a frequency used when the vibration driven motor is driven. This signal is input to the vibration driven motor driving logic circuit 309. The vibration driven motor driving logic circuit 309 receives the vibration driven motor ON/OFF signal output from the terminal PC1 of the microcomputer 301, and the vibration driven motor driving direction signal output from the terminal PC2. When the vibration driven motor ON/OFF signal output from the terminal PC1 is at High level, signals having a frequency ¼ that of the signal input from the signal selector circuit, and a 90° phase difference therebetween are output to the terminals AOUT and BOUT of the vibration driven motor driving motor logic circuit 309.

The frequency of these signals is ¼ the frequency used when the vibration driven motor is driven. As shown in FIG. 21, when the vibration driven motor driving frequency is set to be about 30 kHz, this frequency is about 7.5 kHz. The two signals are amplified by the amplifiers 311 and 312, and are applied to the vibration driven motor 315 through the matching coils 313 and 314.

Upon application of an audible frequency, the vibration driven motor 315 vibrates at the applied frequency, and generates an audible tone. The frequency at this time does not rotate the vibration driven motor, as shown in FIG. 21. For this reason, when the vibration driven motor ON/OFF signal from the microcomputer 301 is controlled, the vibration driven motor generates a signal tone without being driven.

What is claimed is:

1. A control apparatus for a vibration motor which obtains a driving force upon application of a frequency signal to electro-mechanical energy converting elements, comprising:

an oscillation circuit for outputting a signal;

a first counter circuit for counting a number of signal pulses of the signal output from said oscillation circuit, and for generating an output signal when a predetermined number of signal pulses are counted;

a second counter circuit for counting a number of signal pulses of the signal output from said oscillation circuit in response to the output signal from said first counter circuit;

a data circuit for setting data;

a control circuit for generating an output when a count value from said second counter circuit becomes a value according to a data value from said data circuit; and a frequency signal forming circuit for forming a frequency signal on the basis of the output from said control circuit.

2. An apparatus according to claim 1, wherein said first and second counter circuits transit to an initial state every time an output is generated from said control circuit.

3. An apparatus according to claim 1, further comprising a data shift circuit for time-serially changing the data set by said data circuit.

4. An apparatus according to claim 2, further comprising a data shift circuit for time-serially changing the data set by said data circuit.

5. An apparatus according to claim 3, wherein said data shift circuit sequentially increases the data value set by said data circuit.

6. A control apparatus for a vibration motor which obtains a driving force upon application of a frequency signal to electro-mechanical energy converting elements, comprising:

an oscillation circuit for generating a signal;

a first counter circuit for counting a number of signal pulses of the signal generated by the oscillation circuit, and for generating an output signal when a predetermined number of signal pulses from said oscillation circuit are counted;

a monitor circuit for monitoring a signal from said oscillation circuit in response to the output signal from said first circuit;

a data circuit for setting data;

a control circuit for generating an output when the number of signals monitored by said monitor circuit becomes a value according to data from said data circuit; and a frequency signal forming circuit for forming a frequency signal on the basis of the output from said control circuit.

7. An apparatus according to claim 6, wherein said first and second counter circuits transit to an initial state every time an output is generated by said control circuit.

8. An apparatus according to claim 6, further comprising a data shift circuit for time-serially changing the data set by said data circuit.

9. An apparatus according to claim 7, further comprising a data shift circuit for time-serially changing the data set by said data circuit.

10. An apparatus according to claim 8, wherein said data shift circuit sequentially increases the data value set by said data circuit.

11. A control apparatus for a vibration motor which obtains a driving force upon application of a frequency signal to electro-mechanical energy converting elements, comprising:

an oscillation circuit;

a control circuit having a first mode for generating an output during a period in which said oscillation circuit outputs a first predetermined number of signals, and a second mode for generating an output during a period in which said oscillation circuit outputs a second predetermined number of signals equal to a sum of the first predetermined number of signals in the first mode and a preselected number of signals;

a frequency signal forming circuit for forming a frequency signal having a frequency according to the output from said control circuit; and a switching circuit for switching a mode of said control circuit between the first and second modes at each predetermined timing.

12. An apparatus according to claim 11, wherein when the output in the first mode is output a predetermined number of times, said switching circuit selects the second mode, and when the output in the second mode is output a predetermined number of times, said switching circuit selects the first mode.

* * * * *

UNITED STATES PATENT AND TRADEMARK OFFICE
CERTIFICATE OF CORRECTION

PATENT NO. : 5,359,268
DATED : October 25, 1994
INVENTOR(S) : KASHIYAMA

It is certified that error appears in the above-indentified patent and that said Letters Patent is hereby corrected as shown below:

COLUMN 2

Line 28, "direction to." should read --direction.--
    Line 29, Line 29 should be deleted.

COLUMN 3

Line 4, "generating an output is arranged," should read --the comparator generator an output,--.

COLUMN 9

Line 9, "adder 10" should read --adder 10)--.

COLUMN 12

Line 51, "and for," should read --and,--.

COLUMN 16

Line 36, "304," should read --304--.

COLUMN 17

Line 37, "ON" should read --an ON--.

Signed and Sealed this

Twenty-first Day of March, 1995

Attest:

BRUCE LEHMAN

Attesting Officer      Commissioner of Patents and Trademarks